US011965065B2

(12) United States Patent
Awadallah-F et al.

(10) Patent No.: US 11,965,065 B2
(45) Date of Patent: Apr. 23, 2024

(54) RADIOLYTIC METHOD OF PREPARING GELS

(71) Applicant: QATAR UNIVERSITY, Doha (QA)

(72) Inventors: Ahmed Awadallah-F, Cairo (EG); Shaheen Al-Muhtaseb, Doha (QA)

( * ) Notice: Subject to any disclaimer, the term of this patent is extended or adjusted under 35 U.S.C. 154(b) by 810 days.

(21) Appl. No.: 17/076,491

(22) Filed: Oct. 21, 2020

(65) Prior Publication Data

US 2022/0119576 A1    Apr. 21, 2022

Related U.S. Application Data

(60) Provisional application No. 63/094,248, filed on Oct. 20, 2020.

(51) Int. Cl.
| | | |
|---|---|---|
| C01B 32/318 | (2017.01) | |
| C08G 8/22 | (2006.01) | |

(52) U.S. Cl.
CPC .............. *C08G 8/22* (2013.01); *C01B 32/318* (2017.08); *C08G 2220/00* (2013.01)

(58) Field of Classification Search
CPC ................................ C08G 8/22; C01B 32/318
See application file for complete search history.

(56) References Cited

U.S. PATENT DOCUMENTS

| | | | | |
|---|---|---|---|---|
| 4,016,095 | A * | 4/1977 | Ambardanishvili | ..... G21G 4/04 250/493.1 |
| 4,684,558 | A | 8/1987 | Keusch et al. | |
| 4,873,218 | A | 10/1989 | Pekala | |
| 4,997,804 | A | 3/1991 | Pekala | |
| 5,284,621 | A | 2/1994 | Kaufman | |
| 6,989,123 | B2 | 1/2006 | Lee et al. | |
| 7,307,157 | B2 * | 12/2007 | Yoshii | ...................... A61P 31/04 536/124 |
| 8,481,718 | B2 * | 7/2013 | Yagi | ..................... C08B 37/0042 536/124 |

FOREIGN PATENT DOCUMENTS

CN          103599734 A       2/2014

OTHER PUBLICATIONS

Aghabararpour, et al: "Mechanical properties of isocyanate cross-linked resorcinol formaldehyde aerogels", Journal of Non-Crystalline Solids; Dec. 7, 2017; vol. 481, pp. 548-555.
Ahmad, et al: "Development of novel waterborne poly(1-naphthylamine)/poly(vinylacolhol)-resorcinol formaldehyde-cured corrosion resistant composite coatings", Progress in Organic Coatings 2008; vol. 62, pp. 32-39.
Al-Muhtaseb, et al: "Preparation and properties of resorcinol formaldehyde organic and carbon gels", Advanced Materials; Jan. 16, 2003; vol. 15(2), pp. 101-114.
Alamsyah, et al: "Bondability of tropical fast-growing tree species III: curing behavior of resorcinol formaldehyde resin adhesive at toom temperature and effects of extractives of *Acacia mangium* wood on bonding", Journal of Wood Sci., Japan Wood Research Society; Mar. 29, 2008; vol. 54, pp. 208-213.
Alshrah, et al: "Development of high-porosity resorcinol formaldehyde aerogels with enhanced mechanical properties through improved particle necking under CO2 critical conditions", Journal of Colloid and Interface Science 2017; Sep. 14, 2016; vol. 485, pp. 65-74.
Alshrah, et al: "Reinforced resorcinol formaldehyde aerogel with Co-assembled polyacrylonitrile fibers and graphene oxide nanosheets", Materials and Design; Apr. 25, 2018; vol. 151, pp. 154-163.
Anas, et al: "Investigation of various aerogels as adsorbents for methane storage", The Journal of Supercritical Fluids; Nov. 29, 2017; vol. 141, pp. 166-172.
Attia, et al: "Study of transport properties and conduction mechanism of pure and composite resorcinol formaldehyde aerogel doped with Co-ferrite", Materials Science and Engineering B; May 23, 2013; vol. 178, pp. 897-910.
Awadallah-F, et al: "Effect of gas templating of resorcinol-formaldehyde xerogels on characteristics and performances of subsequent activated carbons", Materials Chemistry and Physics; Mar. 11, 2019; vol. 234, pp. 361-368.
Ayme-Perrot, et al: "Evaluation of carbon cryogels used as cathodes for non-flowing zinc-bromine storage cells", Journal of Power Sources 2008 (online Oct. 2, 2007); vol. 175, pp. 644-650.
Babic, et al: "Characterization of carbon cryogel synthesized by sol-gel polycondensation and freeze-drying", Carbon 2004; vol. 42, pp. 2617-2624.
Banerjee, et al: "Recovery of purified radiocesium from acidic solution using ammonium molybdophosphate and resorcinol formaldehyde polycondensate resin", Desalination 2008; vol. 232, pp. 172-180.
Banjerdteerakul, et al: "Synthesis of mesoporous tin dioxide via sol-gel process assisted by resorcinol-formaldehyde gel", Particuology 2018; available online Nov. 24, 2017; vol. 37, pp. 26-32.
Berthon-Fabry, et al: "Evaluation of lightweight and flexible insulating aerogel blankets based on Resorcinol-Formaldehyde-Silica for space applications", European Polymer Journal; Jun. 8, 2017; http://dx.doi.org/10.1016/j.eurpolymj.2017.06.009.
Bock, et al: "Structural investigation of resorcinol formaldehyde and carbon aerogels using SAXS and BET", Journal of Porous Materials 1997; vol. 4, pp. 287-294.

(Continued)

*Primary Examiner* — Stuart L Hendrickson
(74) *Attorney, Agent, or Firm* — Squire Patton Boggs (US) LLP

(57) ABSTRACT

In certain aspects and embodiments, the present invention provides a radiolytic polymerization/gelation method for the synthesis of gels and their subsequent activated carbon derivatives. In certain exemplary embodiments, resorcinol-formaldehyde gels are produced from resorcinol and formaldehyde without additives, catalysts, buffers, initiators or other species. In certain embodiments, ionizing γ-type radiation from $^{60}Co$ is used as a radiation source in the gel crosslinking process. Different compositions of resorcinol/formaldehyde and a wide range of irradiation doses were examined. Various techniques are used to characterize the outcome product, either the gels or their derived carbon gels or activated carbon.

27 Claims, 14 Drawing Sheets

(56) References Cited

OTHER PUBLICATIONS

Brandt, et al: "Acetic-acid-catalyzed and subcritically dried carbon aerogels with a nanometer-sized structure and a wide density range", Journal of Non-Crystalline Solids; Nov. 5, 2004; vol. 350, pp. 131-135.
Brandt: "Acetic acid catalyzed carbon aerogels", Journal of Porous Materials 2003; vol. 10, pp. 171-178.
Bruno, et al: "A novel way to maintain resorcinol-formaldehyde porosity during drying: Stabilization of the sol-gel nanostructure using a cationic polyelectrolyte", Colloids and Surfaces A: Physiochem. Eng. Aspects; Mar. 27, 2010; vol. 362, pp. 28-32.
Calvo, et al: "Influence of alkaline compounds on the porosity of resorcinol-formaldehyde xerogels", Journal of Non-Crystalline Solids; Sep. 21, 2016; vol. 452, pp. 286-290.
Carrasco-Marin, et al: "Carbon aerogels from gallic acid-resorcinol mixtures as adsorbents of benzene, toluene and xylenes from dry and wet air under dynamic conditions", Carbon 2009 (online Nov. 1, 2008); vol. 47, pp. 463-469.
Carrott, et al: "Use of n-nonane pre-adsorption for the determination of micropore volume of activated carbon aerogels", Carbon; Jan. 25, 2007; vol. 45, pp. 1310-1313.
Chaijitrsakool, et al: "Effects of pore characters of mesoporous resorcinol-formaldehyde carbon gels on enzyme immobilization", Journal of Molecular Catalysis B: Enzymatic; Mar. 7, 2008; vol. 55, pp. 137-141.
Chathoth, et al: "Diffusion and adsorption of methane confined in nano-porous carbon aerogel: A combined quasi-elastic and small-angle neutron scattering study", Microporous and Mesoporous Materials 2010; vol. 132, pp. 148-153.
Chung, et al: "Resorcinol-formaldehyde aerogels for CMOS-MEMS capacitive humidity sensor", Sensors and Actuators B: Chemical; Mar. 15, 2015; vol. 214, pp. 181-188.
Cohaut, et al: "The porous network in carbon aerogels investigated by small angle neutron scattering", Carbon; Feb. 22, 2007; vol. 45, pp. 1185-1192.
Conceicao, et al: "New carbon materials with high porosity in the 1-7 nm range obtained by chemical activation with phosphoric acid If resorcinol-formaldehyde aerogels", Carbon 2009; vol. 47, pp. 1867-1885.
Contreras, et al: "A comparison of physical activation of carbon xerogels with carbon dioxide with chemical activation using hydroxides", Carbon; May 8, 2010; vol. 48, pp. 3157-3168.
Czakkel, al: "Influence of drying on the morphology of resorcinol-formaldehyde-based carbon gels", Microporous and Mesoporous Materials; Sep. 1, 2005; vol. 86, pp. 124-133.
Escalona, al: "Water desorption from resorcinol-formaldehyde hydrogels and adsorption in the resulting xerogels", Microporous and Mesoporous Materials 2009 (online Jun. 14, 2008; vol. 117, pp. 61-66.
Fairen-Jimenez, et al: "Porosity and surface area of monolithic carbon aerogels prepared using alkaline carbonates and organic acids as polymerization catalysts", Carbon; Mar. 31, 2006; vol. 44, pp. 2301-2307.
Fang, et al: "A modified activated carbon aerogel for high-energy storage in electric double layer capacitors", Journal of Power Sources; Oct. 27, 2006; vol. 163, pp. 616-622.
Feaver, et al: "Activated carbon cryogels for low pressure methane storage", Carbon 2006 (online Nov. 3, 2005); vol. 44, pp. 587-610.
Fonseca-Correa, et al: "Thermodynamic study of adsorption of nickel ions onto carbon aerogels", Heliyon 2019; vol. 5 pp. e01789.
Fujikawa, et al: "Shape-controlled synthesis of nanocarbons from resorcinol-formaldehyde nanopolymers using surfactant-templated vesicular assemblies", Carbon; Feb. 8, 2007; vol. 45, pp. 1289-1295.
Gaikwad, et al: "Enhanced catalytic graphitization of resorcinol formaldehyde derived carbon xerogel to improve its anodic performance for lithium ion battery", Materials Today Communications; Jul. 16, 2019; vol. 20, pp. 100569.
Gasnier, et al: "Entanglement of N-doped graphene in resorcinol-formaldehyde: effect over nanoconfined LiBH4 for hydrogen storage", Carbon; Mar. 5, 2019; vol. 147, pp. 284-294.
Gross, et al: "Elastic properties of crosslinked resorcinol-formaldehyde gels and aerogels", Journal of Non-Crystalline Solids 1997; vol. 211, pp. 132-142.
Haghgoo, et al: "Characterization of multi-walled carbon nanotube dispersion in resorcinol-formaldehyde aerogels", Microporous and Mesoporous Materials 2014; Oct. 11, 2013; vol. 184, pp. 97-104.
Horikawa, et al: "Controllability of pore characteristics of resorcinol formaldehyde carbon aerogel", Carbon 2004; vol. 42, pp. 1625-1633.
Horikawa, et al: "Influence of surface-active agents on pore characteristics of the generated spherical resorcinol-formaldehyde based carbon aerogels", Carbon 2004; vol. 42, pp. 2683-2689.
Horikawa, et al: "Size control and characterization of spherical carbon aerogel particles from resorcinol formaldehyde resin", Carbon 2004; vol. 42, pp. 169-175.
Hrubesh, Section 8: Applications, "Aerogel Applications", Journal of Non-Crystalline Solids 1998; vol. 225, pp. 335-342.
Hwang, et al: "Capacitance control of carbon aerogel electrodes", Journal of Non-Crystalline Solids 2004; vol. 347, pp. 238-245.
Hwang, et al: "Synthesis and characterization of tin oxide/carbon aerogel composite electrodes for electrochemical supercapacitors", Journal of Power Sources; Aug. 6, 2007; vol. 172, pp. 451-459.
Jin, et al: "Pore structure and pore size controls of ordered mesoporous carbons prepared from resorcinol/formaldehyde/triblock polymers", Microporous and Mesoporous Materials 2009; vol. 118, pp. 218-223; doi:10.1016/j.micromeso.2009.08.030.
Job, et al: "Carbon aerogels, cryogels and xerogels: Influence of the drying method on textural properties of porous carbon materials", Carbon 2005; vol. 43, pp. 2481-2494.
Job, et al: "Carbon xerogels as catalyst supports for PEM fuel cell cathode", Energy Conversion and Management; May 8, 2008; vol. 49, pp. 2461-2470.
Job, et al: "Porous carbon xerogels with texture tailored by pH control during sol gel process", Carbon 2004; vol. 42, pp. 619-628.
Job, et al: "Rheological determination of the sol-gel transition during the aqueous synthesis of resorcinol- formaldehyde resins", Colloids and Surfaces A: Physicochem. Eng. Aspects 2007 (online Jul. 29, 2006); vol. 293, pp. 224-228.
Job, et al: "Synthesis of transition metal-doped carbon xerogels by solubilization of metal salts in resorcinol-formaldehyde aqueous solution", Carbon 2004; vol. 42, pp. 3217-3227.
Job, et al: "Synthesis optimization of organic xerogels produced from convective air-drying resorcinol-formaldehyde gels", Journal of Non-Crystalline Solids 2006; vol. 352, pp. 24-34.
Job, et al: "Towards the production of carbon xerogel monoliths by optimizing convective drying conditions", Carbon 2006; vol. 44, pp. 2534-2542.
Kang, et al: "Enhanced electrochemical capacitance of nitrogen-doped carbon gels synthesized by microwave-assisted polymerization of resorcinol and formaldehyde", Electrochemistry Communications; May 22, 2008; vol. 10, pp. 1105-1108.
Kataoka, et al: "Synthesis of ordered mesoporous carbon thin films at various temperatures in vapor infiltration method", Carbon May 20, 2008; vol. 46, pp. 1358-1367.
Kim, et al: "Fast curing PF resin mixed with various resins and accelerators for building composite materials", Construction and Building Materials 2008 (online Aug. 28, 2007; vol. 22, pp. 2141-2146.
Kinnertova, et al: "Influence of catalyst amount on properties of resorcinol-formaldehyde xerogels", Thermochimica Acta 2018; Dec. 13, 2017; vol. 660, pp. 37-43.
Kocklenberg, et al: "Texture control of freeze-dried resorcinol-formaldehyde gels", Journal of Non-Crystalline Solids 1998; vol. 225, pp. 8-13.
Lafuente, et al: "The influence of single-walled carbon nanotube functionalization on the electronic properties of their polyaniline composites", Carbon Aug. 8, 2008; vol. 46, pp. 1909-1917.
Laskowski, et al: "Subcritically dried resorcinol-formaldehyde aerogels from a base-acid catalyzed synthesis route", Microporous and Mesoporous Materials; Jul. 8, 2014; vol. 197, pp. 308-315.

(56) References Cited

OTHER PUBLICATIONS

Lee, et al: "Preparation of carbon aerogel in ambient conditions for electrical double-layer capacitor", Current Applied Physics 2010; Aug. 28, 2009; vol. 10, pp. 682-686.

Lee, et al: "Properties of resorcinol-tannin-formaldehyde copolymer resins prepared from the bark extracts of Taiwan acacia and China fir", Bioresource Technology 2006 (online Apr. 8, 2005); vol. 97, pp. 257-264.

Leonard, et al: "Evolution of mechanical properties and final textural properties of resorcinol-formaldehyde xerogels during ambient air drying", Journal of Non-Crystalline Solids 2008 (online Sep. 14, 2007); vol. 354, pp. 831-838.

Leonard, et al: "Suitability of convective air drying for the production of porous resorcinol-formaldehyde and carbon xerogels", Carbon 2005; vol. 43, pp. 1778-1814.

Lermontov, et al: "Facile synthesis of fluorinated resorcinol-formaldehyde aerogels", Journal of Fluorine Chemistry; Nov. 4, 2016; vol. 193, pp. 1-7.

Lermontov, et al: "Methyl trifluoropyruvate—a new solvent for the production of fluorinated organic resorcinol-formaldehyde aerogels", Mendeleev Comunications 2018; vol. 28, pp. 102-104.

Li, et al: "Resorcinol-formaldehyde based carbon aerogel: Preparation, structure and applications in energy storage devices", Microporous and Mesoporous Materials; Dec. 17, 2018; vol. 279, pp. 293-315.

Li, et al: "Structure and electrochemical properties of carbon aerogels synthesized at ambient temperatures as supercapacitors", Journal of Non-Crystalline Solids 2008; vol. 354, pp. 19-24.

Li, et al: "Studies on preparation and performances of carbon aerogel electrodes for the application of supercapacitor", Journal of Power Sources 2006; vol. 158, pp. 784-788.

Liang, et al: "Resorcinol-formaldehyde aerogels prepared by supercritical acetone drying", Journal of Non- Crystalline Solids 2000; vol. 271, pp. 167-170.

Linneen, et al: "Application of the macrohomogeneous line model for the characterization of carbon aerogel electrodes in capacitive deionization", Electrochemica Acta; Jan. 23, 2019; vol. 301, pp. 1-7.

Liu, et al: "Carbon aerogel spheres prepared via alcohol supercritical drying", Carbon 2006; vol. 44, pp. 2430-2436.

Long, et al: "Molecular design of polymer precursors for controlling microstructure of organic and carbon aerogels", Journal of Non-Crystalline Solids; May 25, 2009; vol. 355, pp. 1252-1258.

Long, et al: "Preparation and microstructure control of carbon aerogels produced using m-cresol medicated sol-gel polymerization of phenol and furfural", New Carbon Materials, Mar. 2008; vol. 23(2), pp. 165-170.

Lu, et al: "The effects of melamine on the formation of carbon xerogel derived from resorcinol and formaldehyde and its performance for supercapacitor", Journal of Colloid and Interface Science; Apr. 3, 2018; vol. 524, pp. 209-218.

Mahani, et al: "Synthesis, characterization and dielectric properties of one-step pyrolyzed / activated resorcinol-formaldehyde based carbon aerogels for electromagnetic interference shielding applications", Materials Chemistry and Physics; Apr. 18, 2018; vol. 213, pp. 492-501.

Mahata, et al: "Anchoring of a [Mn(salen)C1] complex onto mesoporous carbon xerogels", Journal of Colloid and Interface Science; Mar. 2, 2007; vol. 311, pp. 152-158.

Mahata, et al: "Tuning of texture and surface chemistry of carbon xerogels", Journal of Colloid and Interface Science; May 10, 2008; vol. 324, pp. 150-155.

Maldonado-Hodar, et al: "Surface morphology, metal dispersion, and pore texture of transition metal-doped monolithic carbon aerogels and steam-activated derivatives", Microporous and Mesoporous Materials 2004; vol. 69, pp. 119-125.

Mathieu, et al: "Freeze-dried resorcinol-formaldehyde gels", Journal of Non-Crystalline Solids 1997; vol. 212, pp. 250-261.

Mirzaeian, et al: "Effect of nitrogen doping on electrochemical performance of resorcinol formaldehyde based carbon aerogels as electrode material for supercapacitor applications", Energy; Feb. 15, 2019; vol. 173, pp. 809-819.

Molina-Campos, et al: "Data for the synthesis of resorcinol-formaldehyde aerogels in acidic and basic media", Data In Brief; Apr. 27, 2017; vol. 12, pp. 409-417.

Moreno-Castilla, et al: "Carbon aerogels for catalysis applications: An overview", Carbon 2004; vol. 43, pp. 455-465.

Muehlemann, et al: "Facile synthesis of resorcinol-melamine-formaldehyde based carbon xerogel", Materials Today Proceedings AEM 2016; vol. 5, pp. 13776-13784.

Mukai, et al: "Morphology of resorcinol-formaldehyde gels obtained through ice-templating", Carbon 2005; vol. 43, pp. 1557-1583.

Mulik, et al: "Acid-catalyzed time-efficient synthesis of resorcinol-formaldehyde aerogels and crosslinking with isocyanates", Polyper Prepints 2006; vol. 47(2), pp. 364-365.

Nagy, et al: "Room temperature ionic liquids to tailor resorcinol-formaldehyde polymer gels", Microporous and Mesoporous Materials; Mar. 2020 (online Nov. 15, 2019); vol. 294, pp. 109888.

Nagy, et al: "Synergism of nitrogen and reduced graphene in the electrocatalytic behavior of resorcinol-formaldehyde based carbon aerogels", Carbon; Jul. 28, 2018; vol. 139, pp. 872-879.

Najeh, et al: "Synthesis and characterization of electrical conducting porous carbon structures based on resorcinol-formaldehyde", Solid State Sciences 2009; vol. 11, pp. 1747-1751.

Nie, et al: "Sol-gel synthesis of nanocomposite crystalline HMX/AP coated by resorcinol-formaldehyde", Journal of Physics and Chemistry of Solids 2010; vol. 71, pp. 109-113.

Nishihara, et al: "Preparation of resorcinol-formaldehyde carbon cryogel microhoneycombs", Carbon 2004; vol. 42, pp. 885-901.

Nishiyama, et al: "Microporous carbons prepared from cationic surfactant-resorcinol/formaldehyde composites", Carbon 2005; vol. 43, pp. 269-274.

Noroozi, et al: "Thermal insulation behavior of functionally graded aerogel: The role of novolac molecular-weight", Polymer; Jun. 15, 2019; vol. 178, pp. 121575.

Pekala, et al: "New organic aerogels based upon a phenolic-furfural reaction", Journal of Non-Crystalline Solids 1995; vol. 188, pp. 34-40.

Petricevic, et al: "Skin formation on RF aerogel sheets", Journal of Non-Crystalline Solids 2001; vol. 285, pp. 272-276.

Petricevic, et al: "Structure of carbon aerogels near the gelation limit of the resorcinol-formaldehyde precursor", Journal of Non-Crystalline Solids 1998; vol. 225, pp. 41-45.

Piedboeuf, et al: "How do the micropores of carbon xerogels influence their electrochemical behavior as anodes for lithium-ion batteries?", Microporous and Mesoporous Materials 2019; Aug. 27, 2018; vol. 275, pp. 278-287.

Principe, et al: "Decoupling microporosity and nitrogen content to optimize CO2 adsorption in melamine-resorcinol-formaldehyde xerogels", Materials Today Chemistry; Nov. 2, 2018; vol. 10, pp. 195-205.

Pushkar, et al: "Synthesis of 3-Dimensional Resorcinol-Urea-Formaldehyde carbon xerogel electrode and its application in benthic microbial fuel cell", Electrochemica Acta; Jun. 2, 2019; vol. 317, pp. 281-288.

Reichenauer, et al: "Microporosity in carbon aerogels", Journal of Non-Crystalline Solids 1998; vol. 225, pp. 210-214.

Rodriguez, et al: "Effect of starch as binder in carbon aerogel and carbon xerogel preparation", Journal of Non-Crystalline Solids; Jul. 13, 2019; vol. 522, pp. 119554.

Romero, et al: "Data for the synthesis of pyrogallol-formaldehyde aerogels using two acid catalysts oxalic acid y hydrochloric acid", Data In Brief; Mar. 19, 2019; vol. 23, pp. 103866.

Saliger, et al: "Carbon aerogels from dilute catalysis of resorcinol with formaldehyde", Journal of Non-Crystalline Solids 1997; vol. 221, pp. 144-150.

Saliger, et al: "High surface area carbon aerogels for supercapacitors", Journal of Non-Crystalline Solids 1998; vol. 225, pp. 81-85.

Saquing, al: "Investigation of the supercritical deposition of platinum nanoparticles into carbon aerogels", Microporous and Mesoporous Materials; Jan. 1, 2005; vol. 80, pp. 11-23.

(56) References Cited

OTHER PUBLICATIONS

Schaefer, et al: "Origin of porosity in resorcinol-formaldehyde aerogels", Journal of Non-Crystalline Solids 1995; vol. 186, pp. 159-167.
Scherdel, et al: "Sperical porous carbon particles derived from suspensions and sediments of resorcinol-formaldehyde particles", Carbon; Apr. 21, 2009; vol. 47, pp. 2244-2252.
Schmitt, et al: "Carbon cloth-reinforced and activated aerogel films for supercapacitors", Journal of Non-Crystalline Solids 2001; vol. 285, pp. 277-282.
Schwan, et al: "New soft and spongy resorcinol-formaldehyde aerogels", The Journal of Supercritical Fluids; Sep. 15, 2015; vol. 107, pp. 201-208.
Sepehri, et al: "Enhanced electrochemical and structural properties of carbon cryogels by surface chemistry alteration with boron and nitrogen", Carbon; Jan. 31, 2009; vol. 47, pp. 1436-1443.
Shady, et al: "Selectivity of cesium from fission radionuclides using resorcinol-formaldehyde and zirconyl-molybdopyrophosphate as ion-exchangers", Journal of Hazardous Materials; Jan. 30, 2009; vol. 167, pp. 947-952.
Sharma, et al: "Synthesis of carbon xerogel particles and fractal-like structures", Chemical Engineering Science 2009; Dec. 25, 2008; vol. 64, pp. 1536-1543.
Silva, et al: "Controlling the surface chemistry of carbon xerogels using HNO3-hydrothermal oxidation", Carbon; Mar. 3, 2009; vol. 47, pp. 1670-1679.
Solhy, et al: "MWCNT activation and its influence on the catalytic performance of Pt/MWCNT catalysts for selective hydrogenation", Carbon; Apr. 22, 2008; vol. 46, pp. 1194-1207.
Tashima, et al: "Performance of electric double layer capacitors using nanocarbons produced from nanoparticles of resorcinol-formaldehyde polymers", Materials Chemistry and Physics 2009; vol. 115, pp. 69-73.
Tian, et al: "Enhanced hydrogen storage capacity in carbon aerogels treated with KOH", Carbon; Apr. 5, 2009; vol. 47, pp. 2112-2142.
Tonanon, et al: "Influence of surfactants on porous properties of carbon cryogels prepared by sol-gel polycondensation of resorcinol and formaldehyde", Carbon 2003; vol. 41, pp. 2981-2990.
Tonanon, et al: "Preparation of resorcinol formaldehyde (RF) carbon gels: Use of ultrasonic irradiation followed by microwave drying", Journal of Non-Crystalline Solids 2006; vol. 352, pp. 5683-5686.
Wen, et al: "An activated carbon with high capacitance from carbonization of resorcinol-formaldehyde resin", Electrochemistry Communications; Jan. 20, 2009; vol. 11, pp. 715-718.
Weng, et al: "In-situ polymerization of hydroquinone-formaldehyde resin to construct 3D porous composite LiFePO4/carbon for remarkable performance of lithium-ion batteries", Journal of Alloys and Compounds; Oct. 31, 2019; vol. 818, pp. 152858.
Wu, et al: "Fabrication and nano-structure control of carbon aerogels via a microemulsion-templated sol-gel polymerization method", Carbon 2006; vol. 44, pp. 675-681.
Wu, et al: "Low-density organic and carbon aerogels from the sol-gel polymerization of phenol with formaldehyde", Journal of Non-Crystalline Solids 2005; vol. 351, pp. 915-921.
Wu, et al: "Preparation of low-density carbon aerogels by ambient pressure drying", Carbon 2004; vol. 42, pp. 2033-2039.
Wu, et al: "Synthesis of organic and carbon aerogels from phenol-furfural by two-step polymerization", Microporous and Mesoporous Materials; Aug. 4, 2006; vol. 96, pp. 115-120.
Wu, et al: "The preparations of carbon aerogels based upon the gelation of resorcinol-furfural in isopropanol with organic base catalyst", Journal of Non-Crystalline Solids 2004; vol. 336, pp. 26-31.
Yamamoto, et al: "Control of mesoporosity of carbon gels prepared by sol-gel polycondensation and freeze drying", Journal of Non-Crystalline Solids 2001; vol. 288, pp. 46-55.
Yamamoto, et al: "Evaluation of porous structure of resorcinol-formaldehyde hydrogels by thermoporometry", Thermochimica Acta; Oct. 13, 2005; vol. 439, pp. 74-79.
Yamamoto, et al: "Interpretation of structure formation during the sol-gel transition of a resorcinol-formaldehyde solution by population balance", Journal of Colloid and Interface Science 2003; vol. 264, pp. 532-537.
Yamamoto, et al: "The effects of different synthetic conditions on porous properties of carbon cryogel microspheres", Carbon 2005; vol. 43, pp. 1231-1238.
Yamashita, et al: "Organic and carbon aerogels derived from poly(vinyl chloride)", Carbon 2003; vol. 41, pp. 285-294.
Yang, et al: "Adhesive formulated with chemically modified okara and phenol-resorcinol-formaldehyde for bonding fancy veneer onto high-density fiberboard", Journal of Industrial and Engineering Chemistry 2009; vol. 15, pp. 398-402.
Yoshimune, et al: "Preparation of highly mesoporous carbon membranes via a sol-gel process using resorcinol and formaldehyde", Carbon; Mar. 16, 2008; vol. 46, pp. 1031-1036.
Zanto, et al: "Sol-gel-derived carbon aerogels and xerogels: Design of experiments approach to materials synthesis", Ind. Eng. Chem. Res. May 24, 2002; vol. 41(13), pp. 3151-3162.
Zhang, et al: "Effect of concentration of reactants on porosity of hydrogels, organic and carbon aerogels", Microporous and Mesoporous Materials; Jun. 4, 2004; vol. 72, pp. 167-173.
Zhang, et al: "Effect of pore structure on the electrochemical performance of coal-based activated carbons in the non-aqeous electrolyte", New Carbon Materials; Dec. 2010; vol. 25(2), pp. 129-133.
Zhang, et al: "Preparation and characterization of antibacterial silver-dispersed activated carbon aerogels", Carbon 2004; vol. 42, pp. 3209-3216.
Zhang, et al: "Small angle X-ray scattering study of microstructure changes of organic hydrogels from supercritical carbon dioxide drying", The Journal of Supercritical Fluids 2004; vol. 28, pp. 263-276.
Zhang, et al: "Structure and electrochemical properties of resorcinol formaldehyde polymer-based carbon for electric double-layer capacitors", Carbon; Mar. 20, 2007; vol. 45, pp. 1439-1445.
Zhang, et al: "The investigation of the adsorption of character of carbon aerogels", NanoStructured Materials 1999; Jul. 20, 2017; vol. 11(3), pp. 375-381.
Zhao, et al: "Comprehensive understanding of the formation process on monodisperse resorcinol-formaldehydepolymer and carbon spheres and their use as substrates for surface-enhanced Raman spectroscopy", Applied Surface Science; Nov. 5, 2019; https://doi.org/10.1016/j.apsusc.2019.144591.
Zhao, et al: "Pore structure modification and electrochemical performance of carbon aerogels from resorcinol formaldehyde", Carbon 2009; vol. 4, pp. 1613-1616; doi:10.1016/j.carbon.2008.12.017.
Zhao, et al: "Pore structure modification and electrochemical performance of carbon aerogels from resorcinol formaldehyde", New Carbon Materials 2008; vol. 4, pp. 361-366.
Zhou, et al: "Enhanced hydrogen storage properties of 2LiBH4—LiAlH4 nanoconfined in resorcinol formaldehyde carbon aerogel", Journal of Alloys and Compounds; Jul. 20, 2017; vol. 726, pp. 525-531.
Zhu, et al: "Resorcinol-formaldehyde based porous carbon as an electrode material for supercapacitors", Carbon 2007 (online Sep. 15, 2006); vol. 45, pp. 160-165.
Zubizarreta, et al: "Tailoring the textural properties of activated carbon xerogels by chemical activation with KOH", Microporous and Mesoporous Materials; Mar. 4, 2008; vol. 115, pp. 480-490.
Amaral-Labat et al., "Blue glue": A new precursor of carbon aerogels, Microporous and Mesoporous Materials; Apr. 9, 2012; vol. 158, pp. 272-280.
Aghamiri et al., "Fabrication and characterization of cytochrome c-immobilized polyaniline/ multi-walled carbon nanotube composite thin film layers for biosensor applications," Thin Solid Films 2018; vol. 660, pp. 484-492.
Awadallah-F et al., "Nanofeatures of resorcinol-formaldehyde carbon microspheres," Materials Letters; Aug. 1, 2012; vol. 87, pp. 31-34.

(56) References Cited

OTHER PUBLICATIONS

Awadallah-F et al., "Using electric power to synthesize resorcinolformaldehyde gels with enhanced characteristics," International Journal of Energy Research 2020, pp. 1-10; DOI: 10.1002/er.5106.

Berardi, "The benefits of using aerogel-enhanced systems in building retrofits," Energy Procedia 2017; vol. 134, pp. 626-635.

Buxton, "Radiation Chemistry. Principles and Applications," Farhataziz, Rodgers, M.A.J., Eds.; Verlag Chemie Publishers: Weinheim, Germany, 1987.

Chao et al., "Influence of submicro-sheet zinc phosphate modified by urea-formaldehyde on the corrosion protection of epoxy coating," Surfaces and Interfaces; Mar. 2020; vol. 18, Article 100403.

Charlier et al., "Electronic and transport properties of nanotubes," Reviews of Modern Physics, Apr.-Jun. 2007 (published May 16, 2007); vol. 79, pp. 677-732.

Chen et al., "Self-assembly of 3D neat porous carbon aerogels with NaCl as template and flux for sodium-ion batteries," Journal of Power Sources 2017; vol. 359, pp. 529-538.

Chen et al., "Covalently cross-linked graphene oxide aerogel with stable structure for high-efficiency water purification," Chemical Engineering Journal 2018; vol. 354, pp. 896-904.

De Volder et al., "Carbon nanotubes: Present and future commercial applications," Science 2013; vol. 339, pp. 535-539.

Dolai et al., "Carbon-dot-aerogel sensor for aromatic volatile organic compounds," Sensors and Actuators B 2017; vol. 241, pp. 607-613.

Du et al., "Synthesis of mechanically robust porous carbon monoliths for $CO_2$ adsorption and separation," Journal of Energy Chemistry; Mar. 2020; vol. 42, pp. 1-8.

Enayatpour et al., "Adsorption/desorption study of proteins onto multi-walled carbon nanotubes and amino multi-walled carbon nanotubes surfaces as adsorbents," Journal of Molecular Liquids 2017; vol. 231, pp. 566-571.

Evanoff et al., "Towards ultrathick battery electrodes: Aligned carbon nanotube-enabled architectures," Advanced Materials 2012; vol. 24, pp. 533-537.

Feng et al., "Carbon fiber reinforced carbon aerogel composites for thermal insulation prepared by soft reinforcement," Materials Letters 2012 (available online Sep. 29, 2011); vol. 67, p. 266-268.

Franklin et al., "Viability in carbon nanotube transistors: Improving device-to-device consistency," ACS Nano 2012; vol. 6(2), pp. 1109-1115.

Getoff, "Advancements of radiation-induced degradation of pollutants in drinking and waste water," Appl. Radiat. Isotopes 1989; vol. 40(7), pp. 585-594.

Getoff, "Factors influencing the efficiency of radiation-induced degradation of water pollutants," Radiation Physics and Chemistry 2002; vol. 65, pp. 437-446.

Getoff, "Radiation-induced degradation of water pollutants—State of the Art," Radiat. Phys. Chem. 1996; vol. 47, pp. 581-593.

Gholipour-Ranjbar et al., "Functionalized graphene aerogel with p-phenylenediamine and its composite with porous $MnO_2$: investigating the effect of functionalizing agent on supercapacitive performance," Journal of Materials Science, Mater. Electron. 2016; vol. 27, pp. 10163-10172.

Gong et al., "Tribological properties of polymeric aryl phosphates grafted onto multi-walled carbon nanotubes as high-performances lubricant additive," Tribology International 2017; vol. 116, pp. 172-179.

Guan et al., "Multi-walled carbon nanotubes acting as antioxidant for fluorosilicone rubber," Polymer Degradation and Stability 2018; vol. 156, pp. 161-169.

Hasanain et al., "Gamma sterilization of pharmaceuticals—a review of the irradiation of excipients, active pharmaceutical ingredients, and final drug product formulations," PDA Journal of Pharmaceutical Science and Technology; Mar.-Apr. 2014; vol. 68(2), pp. 113-137.

Hasegawa et al., "Studies on electrochemical sodium storage into hard carbons with binder-free monolithic electrodes," Journal of Power Sources 2016; vol. 318, 41-48.

Hebalkar et al., "Study of correlation of structural and surface properties with electrochemical behavior in carbon aerogels," Journal of Materials Science 2005; vol. 40, pp. 3777-3782.

Hosseini et al., "BC/rGO conductive nanocomposite aerogel as a strain sensor," Polymer 2018; vol. 137, pp. 82-96.

Huo et al., "N-doped graphene/carbon hybrid aerogels for efficient solar steam generation," Carbon 2019; vol. 142, pp. 13-19.

Isa et al., "Multi-walled carbon nanotubes doped Poly(Methyl MethAcrylate) microfiber for relative humidity sensing," Sensors and Actuators A 2018; vol. 272, pp. 274-280.

Jiang et al., "Lightweight spongy bone-like graphene@SiC aerogel composites for highperformance microwave absorption," Chemical Engineering Journal 2018; vol. 337, 522-531.

Jin et al., "Stable support based on highly graphitic carbon xerogel for proton exchange membrane fuel cells," Journal of Power Sources; Apr. 22, 2010; vol. 195, pp. 6323-6328.

Keshipour et al., "Cross-linked chitosan aerogel modified with Au: Synthesis, characterization and catalytic application," Carbohydrate Polymers 2018; vol. 196, pp. 494-500.

Kim et al., "The impregnated synthesis of polypyrrole into carbon aerogel and its applications to photovoltaic materials," Synthetic Metals 2004; vol. 142, pp. 153-160.

Kong et al., "High-performing multi-walled carbon nanotubes/silica nanocomposites for elastomer application," Composites Science and Technology 2018; vol. 162, pp. 23-32.

Kong, et al., "Switchable dual-wavelength all-fiber laser mode-locked by carbon nanotubes," Laser Physics 2015; vol. 25(015101), pp. 1-6.

Kumar, "Potential application of multi-walled carbon nanotubes/activated carbon/bamboo charcoal for efficient alcohol sensing," Journal of Alloys and Compounds 2018; vol. 767, pp. 215-222.

Kwok et al., "Graphene-carbon nanotube composite aerogel with Ru@Pt nanoparticle as a porous electrode for direct methanol microfluidic fuel cell," Applied Energy 2018; vol. 217, pp. 258-265.

Le Caer, "Water Radiolysis: Influence of Oxide Surfaces on $H_2$ Production under Ionizing Radiation," Water 2011, vol. 3, pp. 235-253.

Lee et al., "Antimicrobial properties of lignin-decorated thin multi-walled carbon nanotubes in poly(vinyl alcohol) nanocomposites," European Polymer Journal 2018; vol. 105, pp. 79-84.

Lee et al., "Simple and direct synthesis of ZnO decorated multi-walled carbon nanotube for supercapacitor electrodes," Colloids and Surfaces A: Physicochem. Eng. Aspects 2018; vol. 538, pp. 23-27.

Lei et al., "Fabrication of metal-organic frameworks@cellulose aerogels composite materials for removal of heavy metal ions in water," Carbohydrate Polymers 2019; vol. 205, pp. 35-41.

Li et al., "Functionalized multi-wall carbon nanotubes as an efficient additive for electrochemical DNA sensor," Sensors and Actuators B: Chemical 2017; vol. 239, pp. 652-659.

Li, "Graphene oxide/cellulose aerogels nanocomposite: Preparation, pyrolysis, and application for electromagnetic interference shielding," Carbohydrate Polymers 2016; vol. 150, pp. 172-179.

Lopez-Iglesias et al., "From the printer to the lungs: Inkjet-printed aerogel particles for pulmonary delivery," Chemical Engineering Journal 2019; vol. 357, pp. 559-566.

Lowell et al., "Characterization of porous solids and powders: surface area, pore size and density," ISBN 978-1-4020-2302-6, Kluwer Academic Publishers.

Lu et al., "Thermal conductivity of monolithic organic aerogels," Science 1992, vol. 255, pp. 971-972.

Lu et al., "Convenient fabrication of graphene/gold nanoparticle aerogel as direct electrode for $H_2O_2$ sensing," Materials Letters 2017; vol. 207, pp. 49-52.

Luo et al., "Manufacture of calcium-based sorbents for high temperature cyclic $CO_2$ capture via sol-gel process," Internatonal Journal of Greenhouse Gas Control 2013 (available online Dec. 20, 2012); vol. 12, pp. 193-199.

Luo et al., "Printing single-walled carbon nanotube/Nafion composites by direct writing techniques," Materials and Design 2018; vol. 155, pp. 125-133.

(56) References Cited

OTHER PUBLICATIONS

Magueijo et al., "Polysulfone mixed matrix gas separation hollow fibre membranes filled with polymer and carbon xerogels," Chemical Engineering Science; Jan. 29, 2013; vol. 92, pp. 13-20.
Maleki et al., "Synthesis and biomedical applications of aerogels: Possibilities and challenges," Advances in Colloid and Interface Science 2016; vol. 236, pp. 1-27.
McCarthy et al., Low-voltage, low-power, organic light-emitting transistors for active matrix displays, Science 2011; vol. 332, pp. 570-571.
McEnaney et al., "Aerogel-based solar thermal receivers," Nano Energy 2017; vol. 40, pp. 180-186.
Montes et al., "Aerogels and their applications," Colloidal Metal Oxide Nanoparticles 2020; pp. 337-399.
Mulik et al., "Macroporous electrically conducting carbon networks by pyrolysis of isocyanate-cross-linked resorcinal-formaldahyde aerogels," Chemical Materials 2008; vol. 20, pp. 6985-6997.
Nie et al., "Sensitivity enhanced, stability improved ethanol gas sensor based on multi-wall carbon nanotubes functionalized with Pt—Pd nanoparticles," Sensors and Actuators B 2018; vol. 270, pp. 140-148.
Oyedoh et al., "Preparation of Controlled Porosity Resorcinol Formaldehyde Xerogels for Adsorption Applications," Chemical Engineering Transactions 2013; vol. 32, pp. 1651-1656.
Pekala et al., "Carbon electrodes for electrochemical applications," Journal of Non-Crystalline Solids 1998; vol. 225, pp. 74-80.
Pekala et al., "Organic aerogels from the polycondensation of resorcinol with formaldehyde," Journal of Materials Science 1989; vol. 24, pp. 3221-3227.
Pekala et al., "A Synthetic route to organic aerogels—mechanism, structure, and properties," Journal de Physique Colloques; Apr. 1989, vol. 50(C4), pp. C4-33-C4-40.
Peng et al., "Measurements of near-ultimate strength for multiwalled cabon nanotubes and irradiation-inducded crosslinking improvements," Nature Nanotechnology; Aug. 10, 2008; vol. 3, pp. 626-631.
Porada et al., "Water desalination using capacitive deionization with microporous carbon electrodes," ACS Applied Materials & Interfaces; Feb. 13, 2012; vol. 4, pp. 1194-1199.
Rahimabady et al., "Dielectric nanocomposite of diphenylethylenediamine and P-type multi-walled carbon nanotube for capacitive carbon dioxide sensors," Sensors and Actuators B: Chemical 2017 (published online Dec. 8, 2016); vol. 243, pp. 596-601.
Rodrigues et al., "Glycerol oxidation with gold supported on carbon xerogels: Tuning selectives by varying mesopore sizes," Applied Catalysis B: Environmental 115-116, pp. 1-6; Dec. 11, 2011.
Sakar et al., "Nano drug delivery systems and gamma radiation sterilization," Pharmaceutical Development and Technology 2017 (available online Mar. 23, 2016); vol. 22(6), pp. 775-784.
Shameli et al., "Synthesis of cross-linked PVA membranes embedded with multi-wall carbon nanotubes and their application to esterification of acetic acid with methanol," Chemical Engineering Journal 2017; vol. 309, pp. 381-396.
Shouman et al., "Microporous nanohybrids of carbon xerogels and multi-walled carbon nanotubes for removal of rhodamine B dye," Journal of Water Process Engineering 2018, vol. 23, pp. 165-173.
Sing et al., "Reporting physisorption data for gas/solid systems" (with special reference to the determination of surface area and porosity); Pure Appl. Chem. 1985; vol. 57, p. 603.
Singh et al., "Radiation sterilization of tissue allografts: A review," World Journal of Radiology; Apr. 28, 2016; vol. 8, pp. 355-369.
Singh et al., "Facile synthesis of highly conducting and mesoporous carbon aerogel as platinum support for PEM fuel cells," International Journal of Hydrogen Energy 2017; vol. 42, pp. 11110-11117.
Spinks et al., "An Introduction to Radiation Chemistry," Third edition; Wiley-Interscience publication: New York, NY, USA, 1990.
Tang et al., "Characteristics of biochar and its application in remediation of contaminated soil," Journal of Bioscience and Bioengineering 2013; vol. 116, pp. 653-659.
Terasawa et al., "Electrochemical and electromechanical properties of activated multi-walled carbon nanotube polymer actuator that surpass the performance of a single-walled carbon nanotube polymer actuator," Materials Today: Proceedings 2016; Article 3S, pp. S178-S183.
Vivo-Vilches et al., "From Carbon Molecular Sieves to VOCs filters: Carbon gels with tailored porosity for hexane isomers adsorption and separation," Microporous and Mesoporous Materials 2018; vol. 270, pp. 161-167.
Volosin et al., "High-surface area mesoporous carbons from gel templating and inorganic-organic hybrid gel formation," Journal of Solid State Chemistry: Jan. 2020: vol. 281, Article 121040.
Wang et al., "Preparation of carbon nanotubes/graphene hybrid aerogel and its application for the adsorption of organic compounds," Carbon 2017; vol. 118, pp. 765-771.
Wang et al., "3D carbon quantum dots/graphene aerogel as a metal-free catalyst for enhanced photosensitization efficiency," Applied Catalysis B: Environmental 2018; vol. 233, pp. 11-18.
Wang et al., Removal of organic solvents/oils using carbon aerogels derived from waste durian shell. Journal of the Taiwan Institute of Chemical Engineers 2017; vol. 78, pp. 351-358.
White et al., "Characterisation of commercially CVD grown multi-walled carbon nanotubes for paint applications," Progress in Organic Coatings 2016; vol. 90, pp. 44-53.
Wu et al., "Self-imaging in multi-walled carbon nanotube arrays at visible wavelengths," Carbon 2016; vol. 108, pp. 47-51.
Xiong et al., "Multi-walled carbon nanotube/amino-functionalized MIL-53(Fe) composites: Remarkable adsorptive removal of antibiotics from aqueous solutions," Chemosphere 2018; vol. 210, pp. 1061-1069.
Xu et al., "Self-healing thermoplastic polyurethane (TPU)/ polycaprolactone (PCL) /multi-wall carbon nanotubes (MWCNTs) blend as shape-memory composites," Composites Science and Technology 2018; vol. 168, pp. 255-262.
Yang et al., "Modelling and optimization of the pore structure of carbon aerogels using an artificial neural network," New Carbon Materials; Feb. 2017; vol. 32(1), pp. 77-85.
Yu et al., "Polypyrrole-anchored cattail biomass-derived carbon aerogels for high performance binder-free supercapacitors," Carbohydrate Polymers 2018; vol. 199, pp. 555-562.
Yue et al., "Hybrid aerogels derived from banana peel and waste paper for efficient oil absorption and emulsion separation," Journal of Cleaner Production 2018; vol. 199, pp. 411-419.
Zafra et al., "Electrosorption of environmental concerning anions on a highly porous carbon aerogel" Journal of Electroanalytical Chemistry; Oct. 4, 2013; vol. 708, pp. 80-86.
Zeng et al., "Nitrogen-doped carbon aerogels with high surface area for supercapacitors and gas adsorption," Materials Today Communications 2018; vol. 16, pp. 1-7.
Zhang et al., "Synthesis of core-shell covalent organic frameworks/ multi-walled carbon nanotubes nanocomposite and application in lithium-sulfur batteries," Materials Letters 2018; vol. 213, pp. 143-147.
Zhao et al., "PEGylated multi-walled carbon nanotubes as versatile vector for tumor-specific intracellular triggered release with enhanced anti-cancer efficiency: Optimization of length and PEGylation degree," Colloids and Surfaces B: Biointerfaces 2018; vol. 168, pp. 43-49.
Zhong et al., "Fabrication of Pt-doped carbon aerogels for hydrogen storage by radiation method," International Journal of Hydrogen Energy 2018; vol. 43, pp. 19174 -19181.
Zhou et al., "Outstanding superhydrophobicity and corrosion resistance on carbon-based film surfaces coupled with multi-walled carbon nanotubes and nickel nanoparticles," Surface Science 2018; vol. 677, pp. 193-202.
Zhu et al., "Clay-based nanofibrous membranes reinforced by multi-walled carbon nanotubes," Ceramics International 2018: vol. 44. pp. 15873-15879.
Zhu et al., "Design and optimization of core/shell structures as highly efficient opacifiers for silica aerogels as high-temperature thermal insulation," International Journal of Thermal Sciences 2018; vol. 133, pp. 206-215.
Zubizarreta et al., "Ni-doped carbon xerogels for $H_2$ storage," Carbon 2010 (online Apr. 3, 2010); vol. 48, pp. 2722-2733.

(56) References Cited

OTHER PUBLICATIONS

NPCS an ISO 9000 Certified Company: Phenolic Resins Production Business Phenol-Formaldehyde Resins; https://www.niir.org/blog/phenolic-resins-production-business/.
Grand View Research: Phenolic Resins Market Size, Share _ Industry Trend Report, 2019-2025; https://www.grandviewsearch.com/industry-analysis/phenolic-resins-market.
Tannert, et al: "Reduction of shrinkage and brittleness for resorcinol-formaldehyde aerogels by means of pH- controlled sol-gel process", The Journal of Supercritical Fluids; Nov.-Dec. 2015 (online Jul. 6, 2015); vol. 106, pp. 57-61.

* cited by examiner

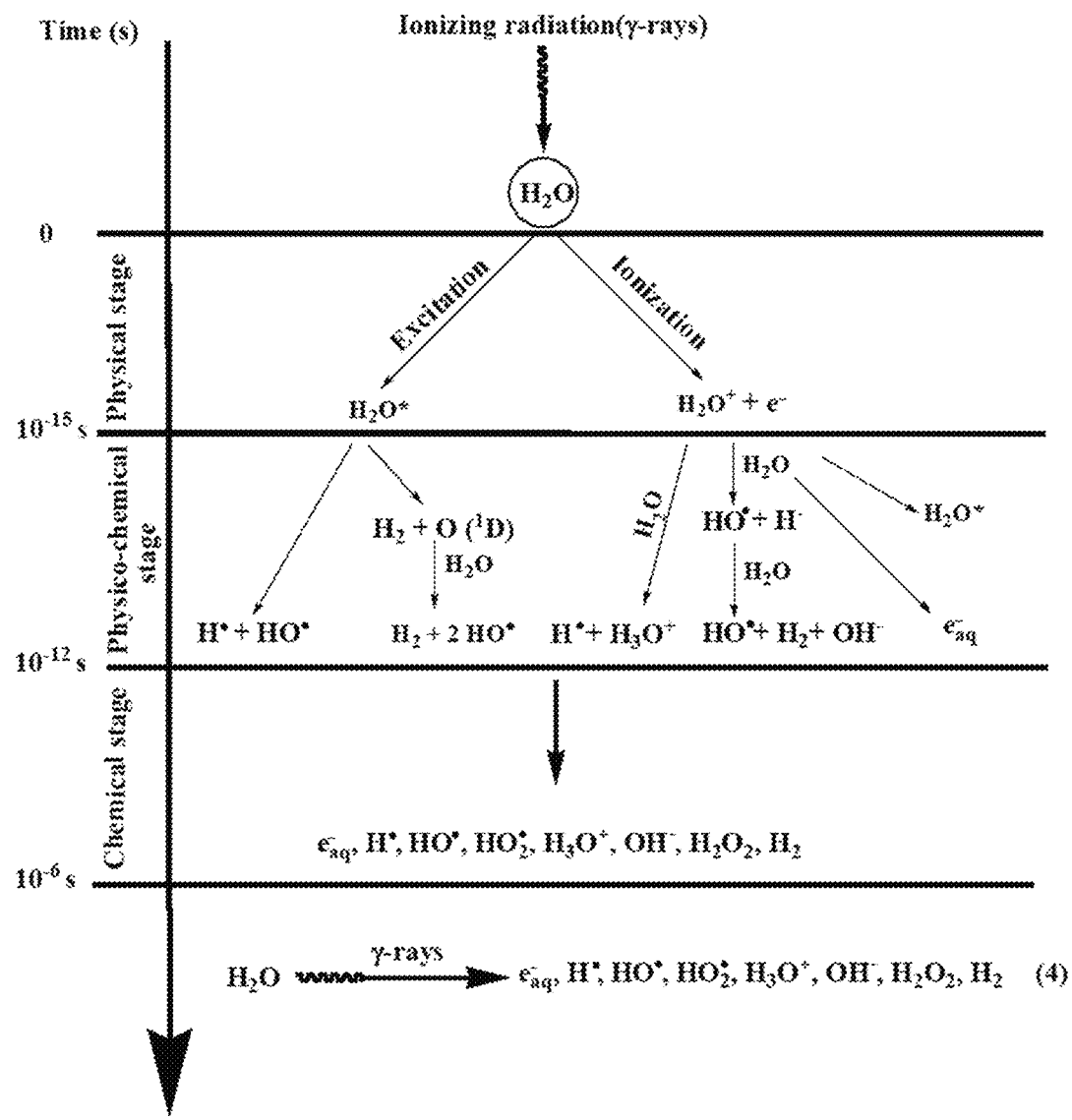
FIG. 1A: A proposed radiolytic reaction mechanism of $H_2O$.

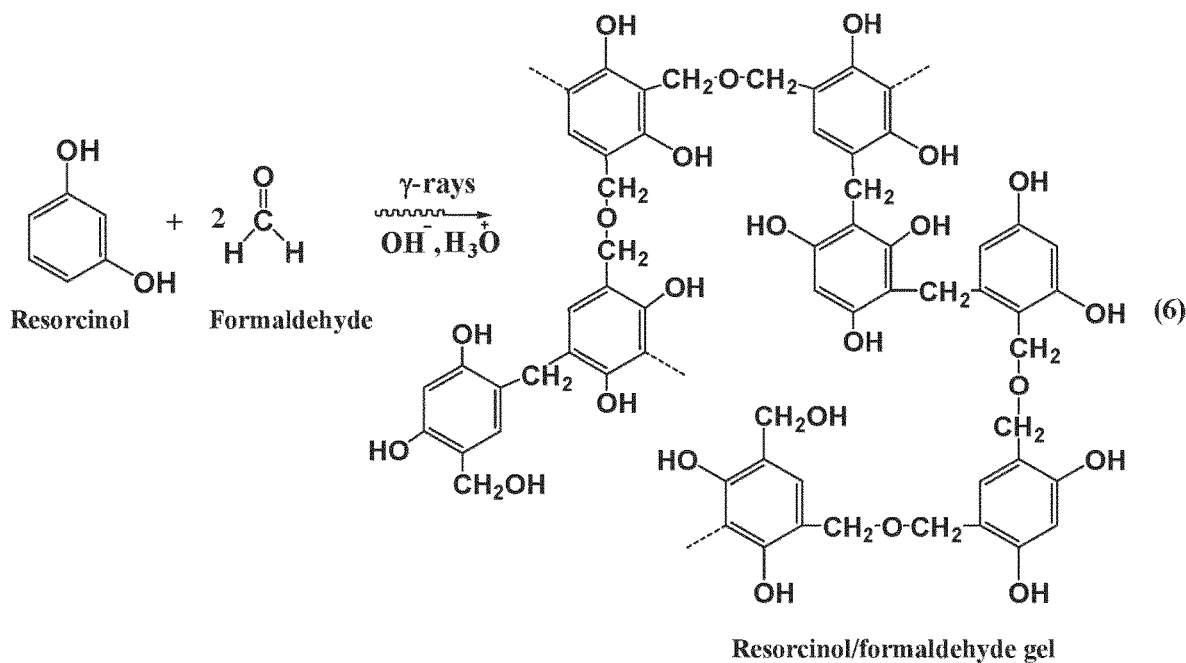
FIG. 1B: A proposed radiolytic reaction mechanism of resorcinol/formaldehyde gel formation.
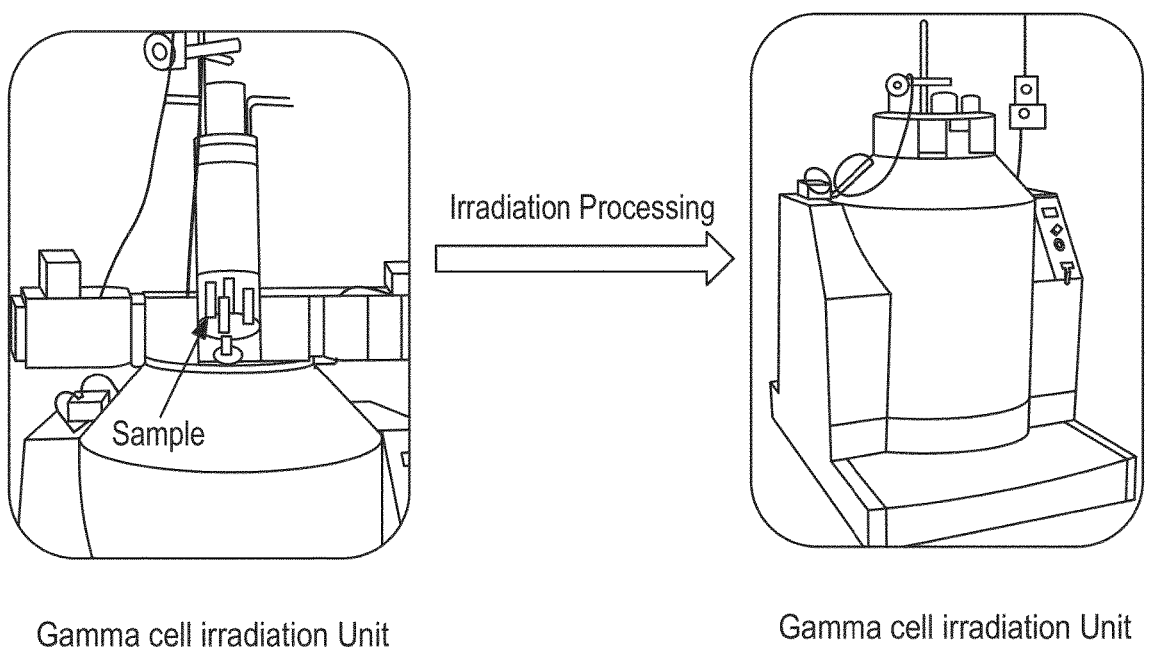
FIG. 1C: Gamma cell irradiation unit and sample irradiation processing.

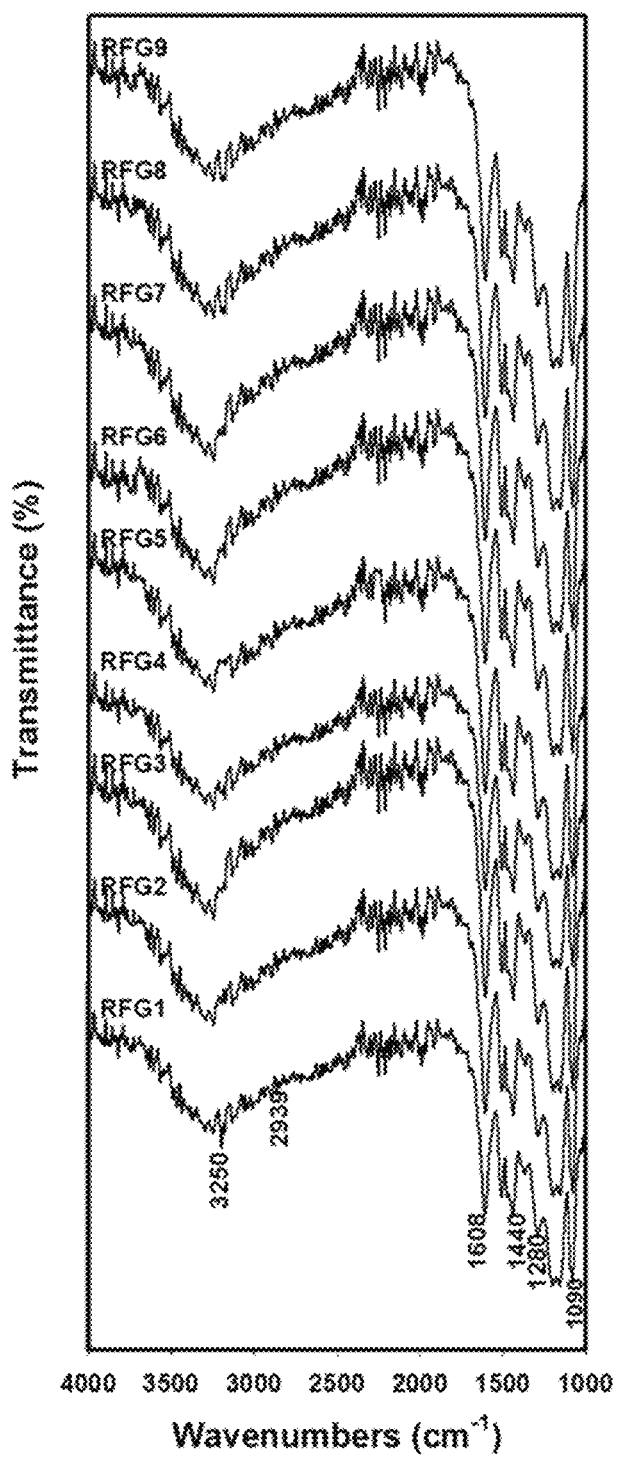
FIG. 2: FTIR spectra of RFG1 through RFG9 crosslinked at 40 kGy with a dose rate of 0.34 kGy/h.

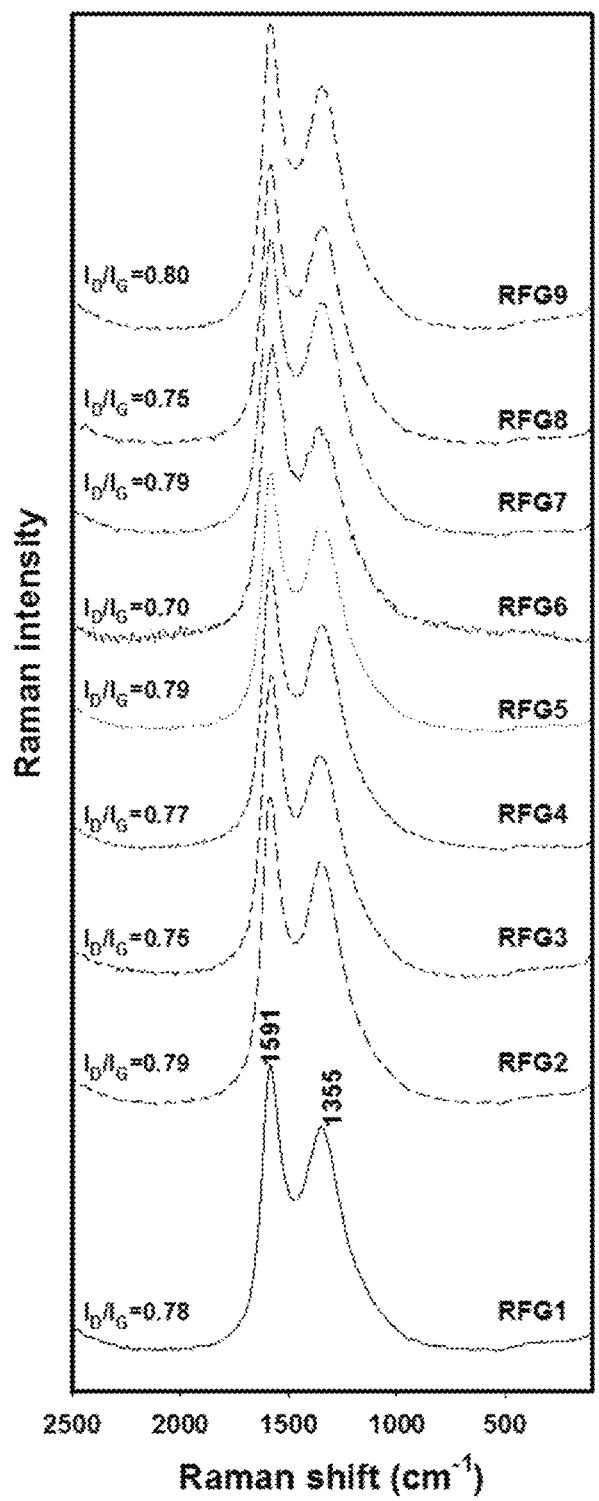
FIG. 3: Raman spectra of RFG1 through RFG9 crosslinked at 40 kGy with a dose rate of 0.34

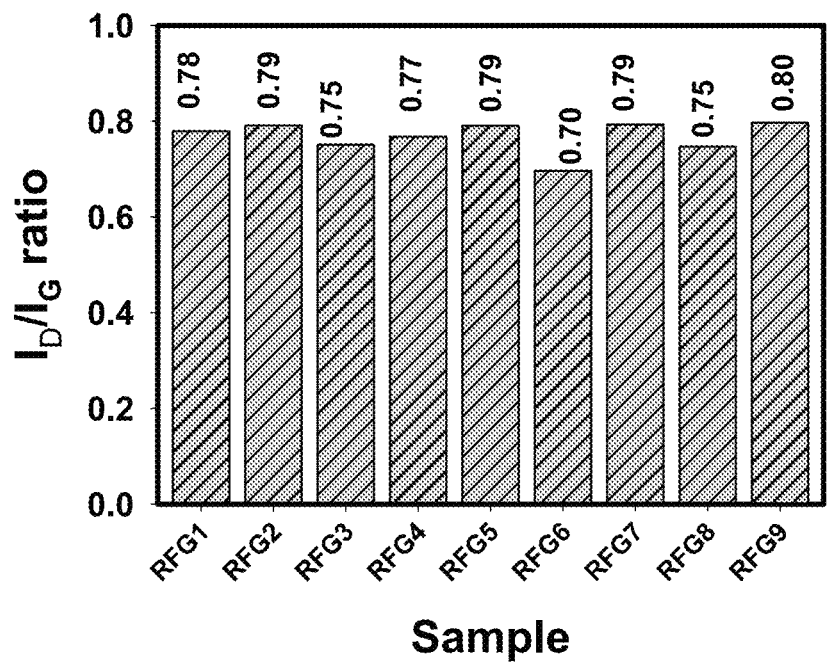
FIG. 4: Raman intensity ratios ($I_D/I_G$) of RFG1 through RFG9 crosslinked at 40 kGy with a dose rate of 0.34 kGy/h.

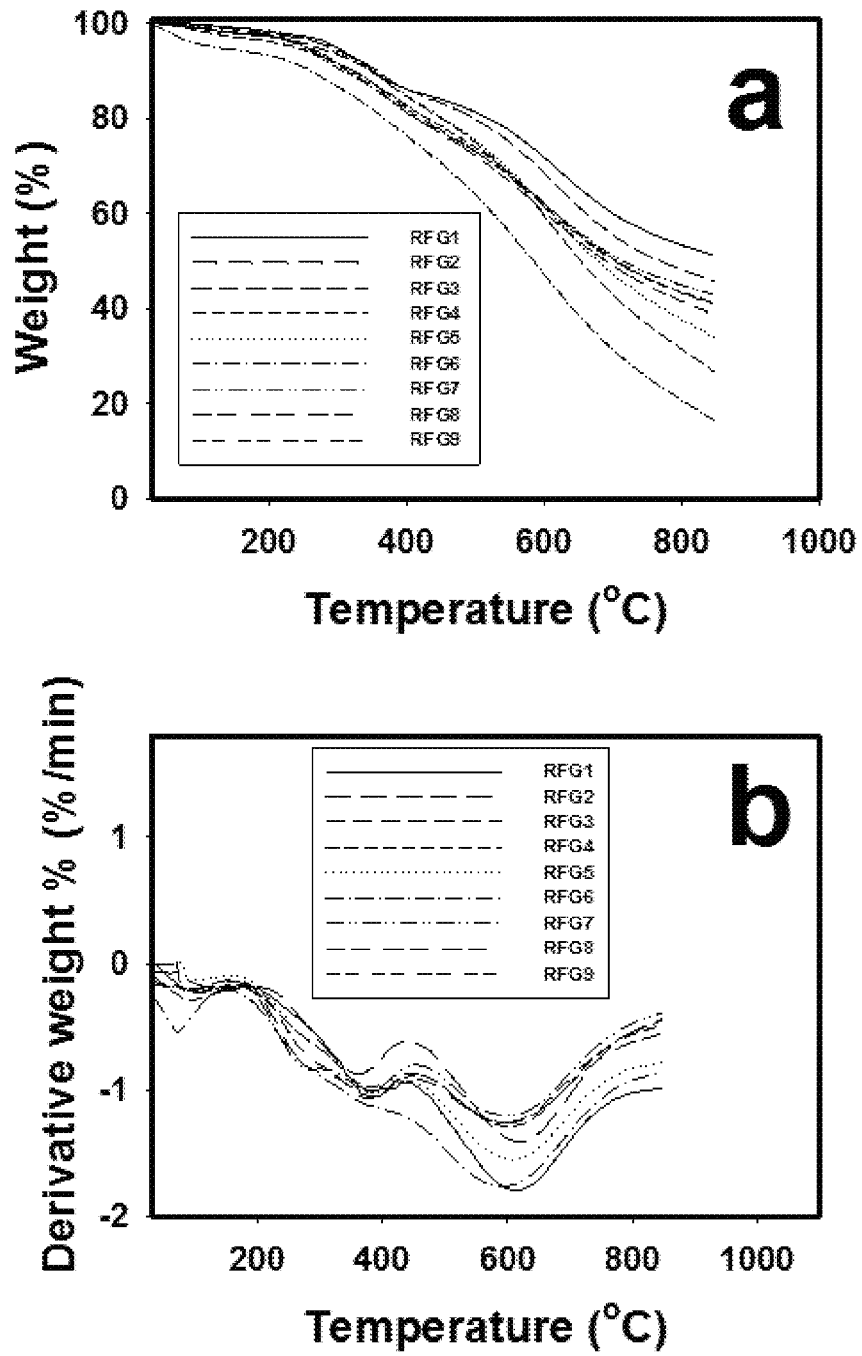
FIGS. 5A & 5B: TGA (a) and DTG (b) thermograms, respectively, of RFG1 through RFG9 crosslinked at 40 kGy with a dose rate of 0.34 kGy/h.

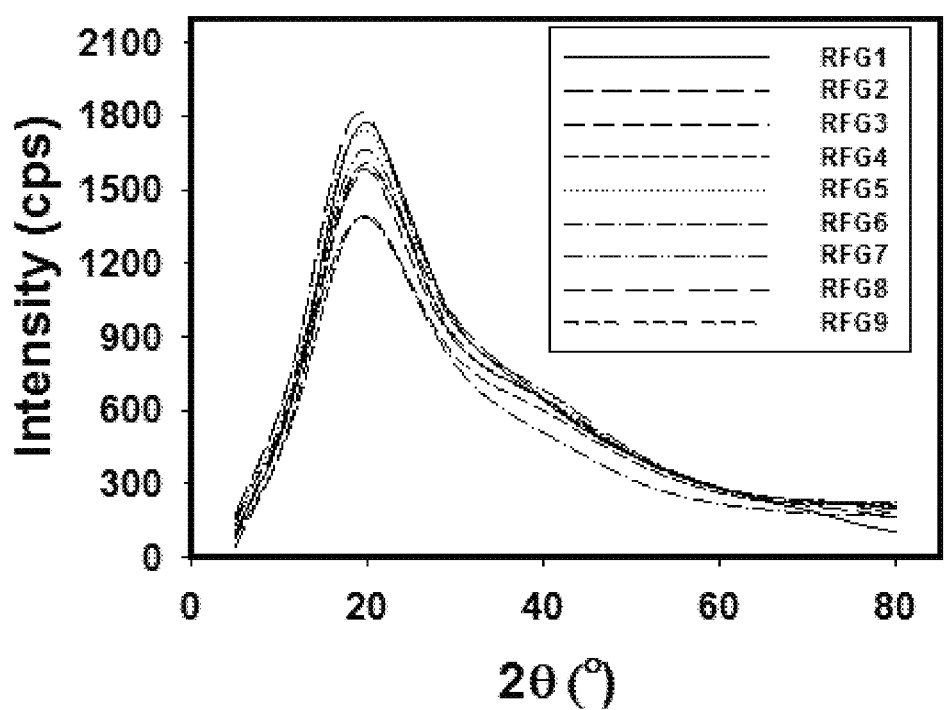
FIG. 6: XRD patterns of RFG1 through RFG9 crosslinked at 40 kGy with a dose rate of 0.34 kGy/h.

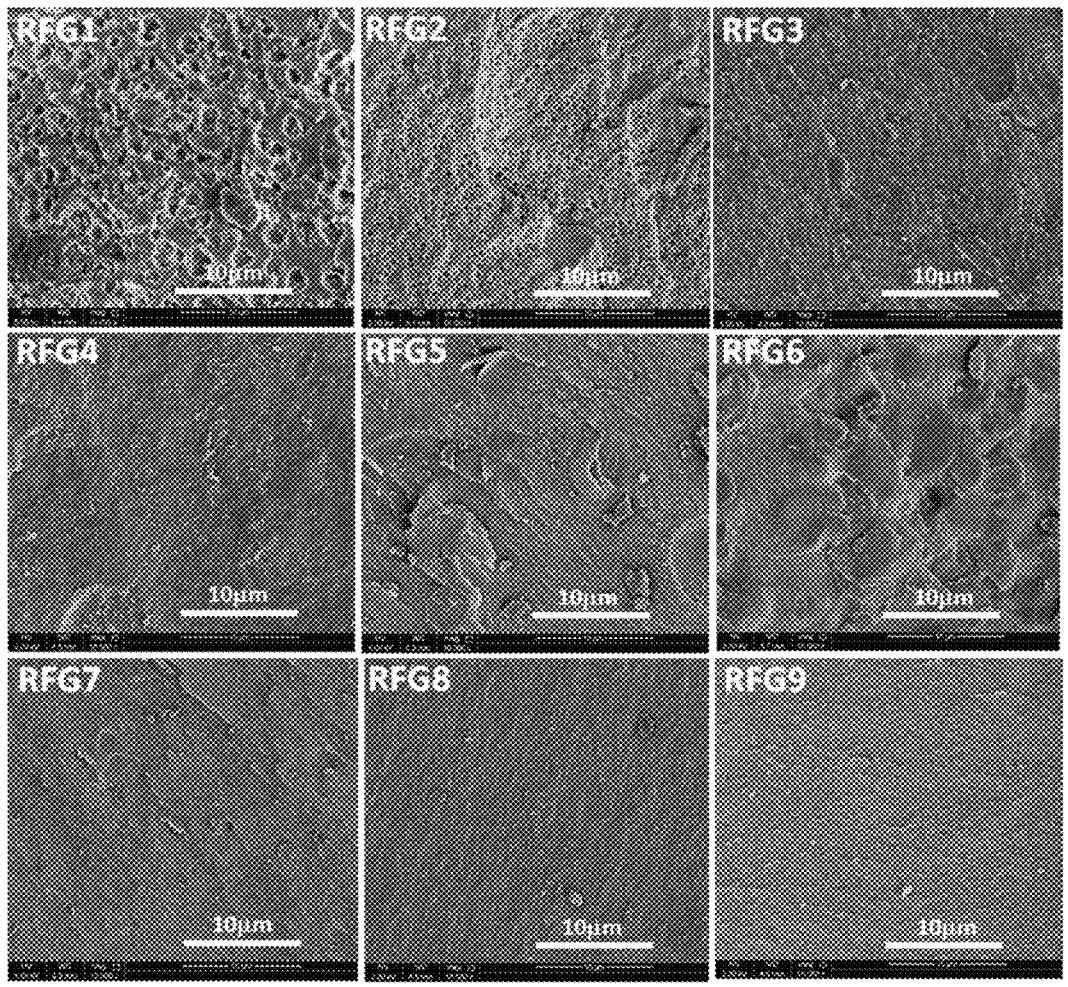
FIG. 7: SEM photomicrographs of RFG1 through RFG9 crosslinked at 40 kGy with a dose rate of 0.34 kGy/h. The scale bar size is 10 μm.

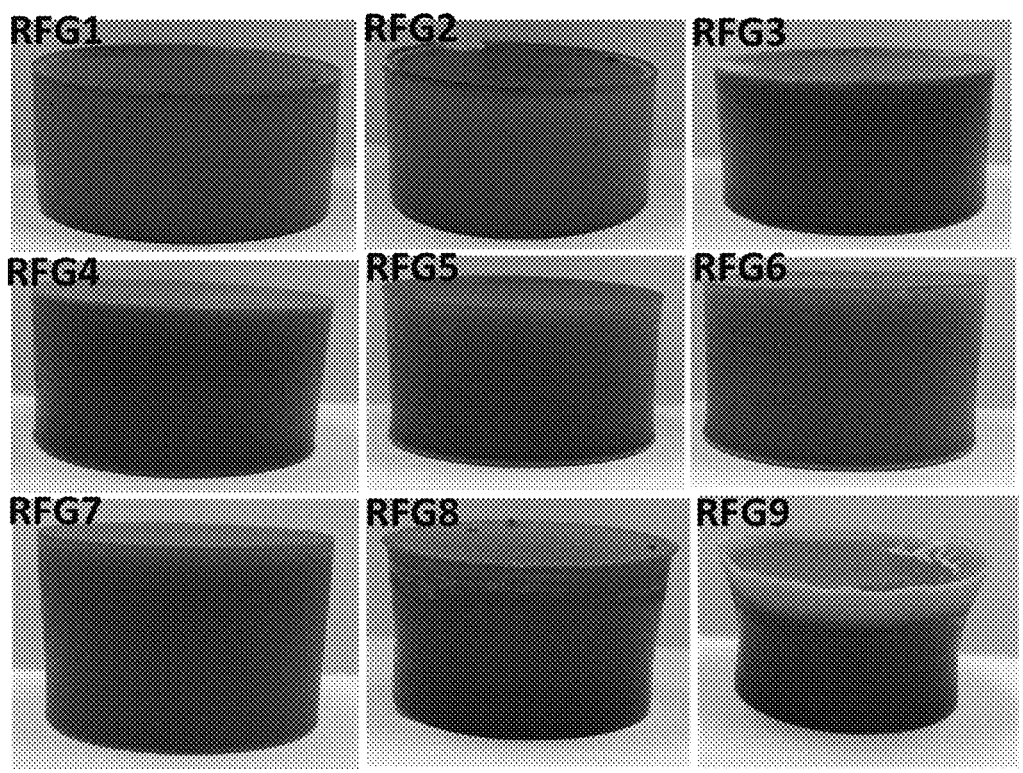
FIG. 8: Optical photos of RFG1 through RFG9 crosslinked at 40 kGy with a dose rate of 0.34 kGy/h.

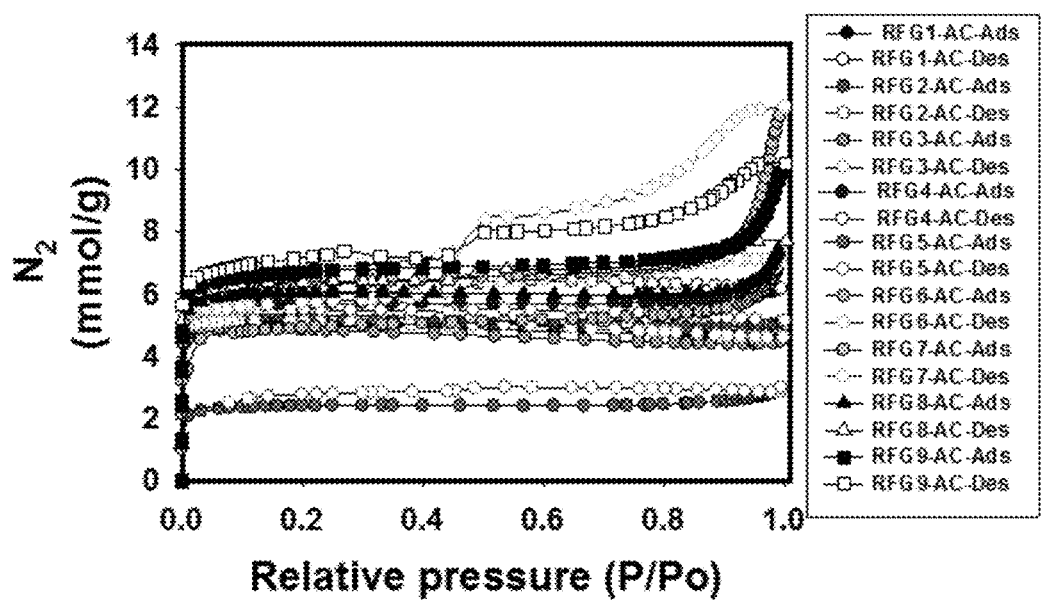
FIG. 9: N₂ gas adsorption/desorption isotherms at -196 °C onto RFG1-AC through RFG9-AC.

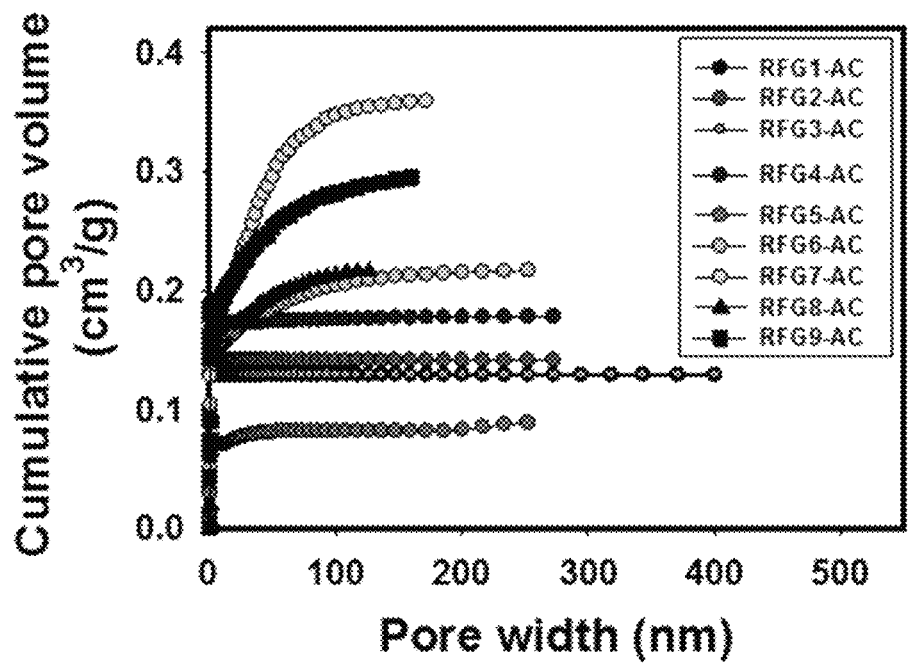
FIG. 10: Cumulative pore volume versus pore width for RFG1-AC through RFG9-AC.

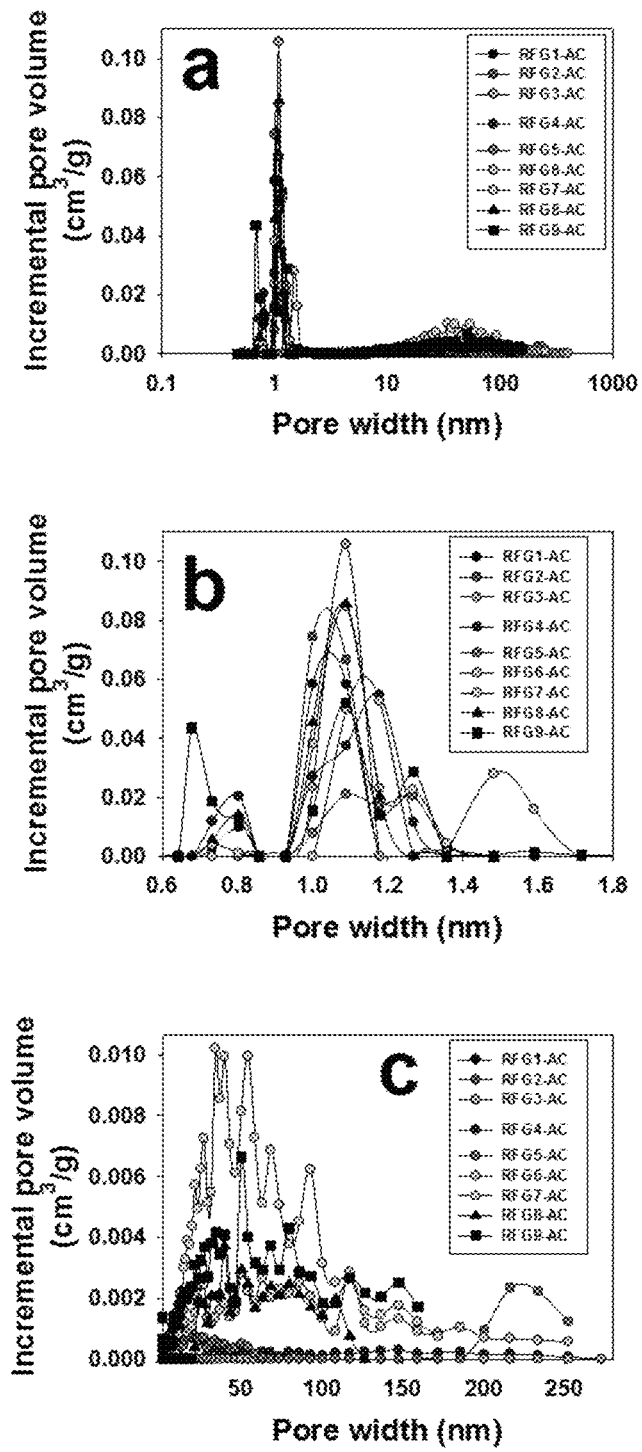
FIGS. 11A, 11B, & 11C: (a) Full x-axis scale of incremental pore volume versus pore width and x-axis in log scale, (b) truncated x-axis and zoomed-in scale of 0.6-1.8 nm and (c) truncated x-axis and zoomed-in scale of 2-280 nm. Samples are RFG1-AC through RFG9-AC from corresponding gels that were prepared at 40 kGy with a dose rate of 0.34 kGy/h.

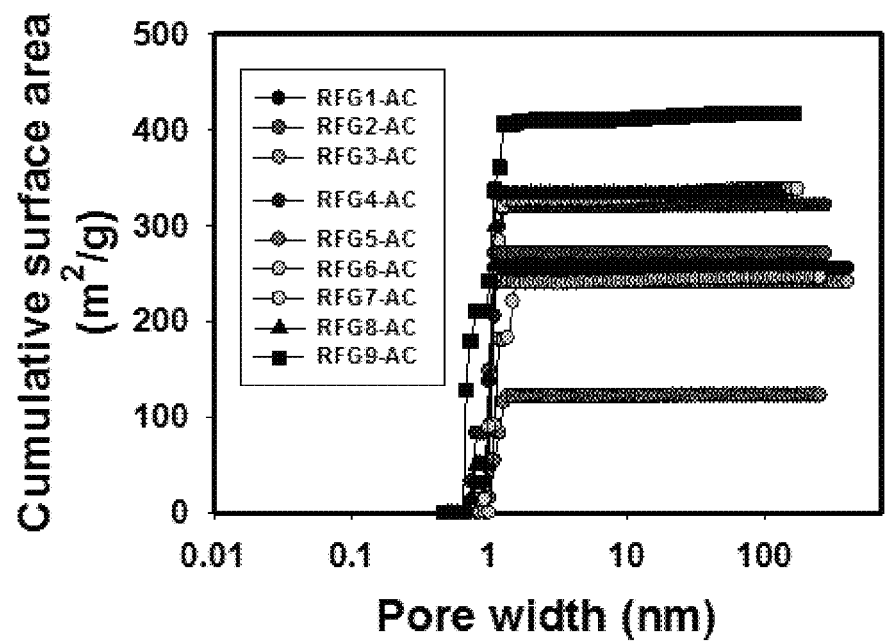
FIG. 12: Cumulative surface areas versus pore width of RFG1-AC through RFG9-AC from corresponding gels that were prepared at 40 kGy with a dose rate of 0.34 kGy/h.

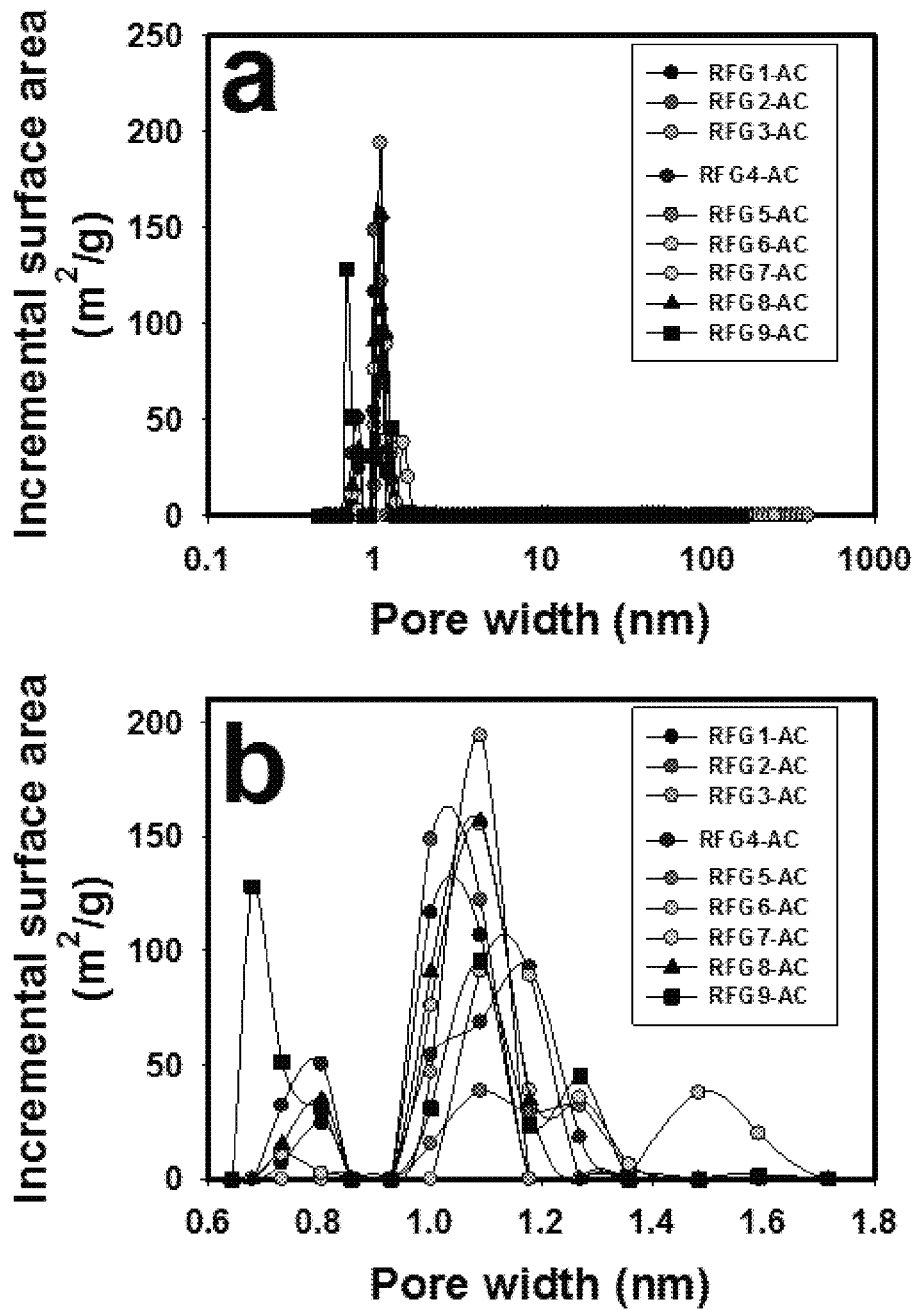
FIGS. 13A & 13B: (a) Full x-axis scale of incremental surface area versus pore width and x-axis in log scale and (b) truncated x-axis and zoomed-in scale of 0.6-1.8 nm of RFG1-AC through RFG9-AC from gels that were prepared at 40 kGy with a dose rate of 0.34 kGy/h.

RADIOLYTIC METHOD OF PREPARING GELS

CROSS-REFERENCE TO RELATED APPLICATIONS

This application claims priority to U.S. Provisional Patent Application No. 63/094,248 (filed Oct. 20, 2020), which is incorporated by reference herein.

FIELD

Presented herein is a radiolytic method for preparing gels (e.g., resorcinol/formaldehyde gels) and their derivatives without catalysts, buffers or other additives or species.

BACKGROUND OF THE INVENTION

Traditionally, the conventional synthesis of gels from phenolic compounds and formaldehyde, such as resorcinol/formaldehyde gels and their derivatives, depends fundamentally on the use of additives or other species (e.g., catalysts and buffers) to complete crosslinking polymerization and gelation reaction. Such conventional reaction results in gel products that are potentially contaminated with additives that restrict their use in sensitive applications such as biomaterials, pharmaceuticals, biomedical applications, cosmetics, and the like.

Organic gels [e.g., resorcinol-formaldehyde (RF) gels] and their subsequent carbon derivatives are important in numerous applications that include catalyst supports, adsorbents (e.g., for carbon dioxide capture, gas separation and purification, hydrogen storage, soil remediation, and water purification), fuel cells and electrochemical processes, selective membranes, insulations, and the like. Their economic importance in industry creates a dire need for developing novel and improved approaches with low cost, ease of production, environmental friendliness, and sterilization that may allow such products to be used directly in biomaterials, cosmetics, or drug fields.

The methods for their synthesis reported in the literature are common and require additives, catalysts, or basic/acidic reagents. The conventional synthesis method created by Pekala in 1989 to synthesize the RF gels is commonly used in major works. The drawbacks of this method are the long synthesis time required and the need to use additives, such as catalysts and acid or basic reagents. Such additives may remain in the final product matrix, which may restrict their usefulness in biomaterial, cosmetic, pharmaceutical, or other medical applications. Furthermore, the clearing of these gels from additives by bleaching is not environmentally friendly, as these additives may transfer to the surrounding environment as well as contaminate the final products.

In some preferred aspects, the inventive synthesis method has features of cleanness, easy production and mass scale of product, environmental friendliness, lack of additives in the final products, and short time required to produce the gel product. This invention focuses on the synthesis of RF gels with different compositions of the main reactants using an irradiation of gamma rays (e.g., γ-rays of $^{60}Co$) in a wide range. The activated carbons of the outcome gels are prepared, and the resulting RF gels and their derived activated carbons are identified by different techniques.

SUMMARY OF THE INVENTION

In certain aspects, the present invention provides a radiolytic method of synthesizing gels (e.g., resorcinol/formaldehyde gels) and their derivatives without catalysts, buffers, or other additives or species.

In certain aspects and embodiments, the present invention may provide a process for synthesis of xerogel, aerogel, and cryogel from resorcinol/formaldehyde or their reactants derivatives and converting them to activated carbons. In certain aspects and embodiments, the crosslinked gels or in their subsequent activated carbon gels provide unusual, advantageous characteristics.

In certain aspects and embodiments, the invention presents a method of synthesizing a phenolic compound-formaldehyde gel, the method including:
preparing a reaction mixture comprising a phenolic compound and formaldehyde; and
irradiating the reaction mixture with an ionizing radiation, thereby producing the phenolic compound-formaldehyde gel.

In certain aspects and embodiments, the phenolic compound is selected from the group including a dihydroxybenzene, a trihydroxybenzen, and mixtures thereof. In certain embodiments, the phenolic compound is selected from the group including resorcinol, catechol, hydroquinone, and mixtures thereof (e.g., resorcinol).

In certain aspects and embodiments, the ionizing radiation is gamma irradiation (e.g., from a radiation source comprising radioactive $^{60}Co$ as the main source). In certain embodiments, the gamma irradiation dose is occurred in the range of 10 to 70 kGy.

In certain aspects and embodiments, the rate of gamma irradiation is from about 0.1 to 0.8 kGy/h. In certain embodiments, the rate of gamma irradiation is about 0.35 kGy/h (e.g., 0.34 kGy/h).

In certain aspects and embodiments, the reaction mixture does not comprise a polymerization or gelation initiator, a polymerization or gelation catalyst, an acid, a base, or a buffer or other species.

In certain aspects and embodiments, the reaction mixture does not comprise a solvent.

In certain aspects and embodiments, the phenolic compound-formaldehyde gel may be a xerogel, an aerogel, or a cryogel.

In certain aspects and embodiments, the gelation of the reaction mixture comprises crosslinking of the phenolic compound during irradiation of the reaction mixture.

In certain aspects and embodiments, the method further comprises:
forming the phenolic compound-formaldehyde gel.

In certain aspects and embodiments, forming the phenolic compound-formaldehyde gel comprises heat drying the phenolic compound-formaldehyde gel at about 50° C. for 3 days.

In certain aspects and embodiments, the method further comprises:
converting the phenolic compound-formaldehyde gel to a carbon gel.

In certain aspects and embodiments, converting the resorcinol-formaldehyde gel to a carbon gel comprises heating the formed gel up to about 500° C. (e.g., with a temperature ramp of about 10° C./min), keeping the gels at about 500° C. for 3 hours, and then allowing the gels to cool to room temperature while purging with a gas (e.g., nitrogen). In certain aspects, the purging with gas (e.g., nitrogen) is at a flow rate of about 100 cm$^3$/min. In certain aspects, the gels cool spontaneously to room temperature while being purged with nitrogen gas.

In certain aspects and embodiments, converting the resorcinol-formaldehyde gel to an activated carbon gel comprises heating up to about 700° C. (e.g., with a temperature ramp of about 10° C./min), keeping the sample at this temperature for 1 hour, and then allowing the sample to cool to room temperature while purging with a gas (e.g., carbon dioxide). In certain embodiments, the purging with gas (e.g., carbon dioxide) is at a flow rate of about 150 cm$^3$/min. In certain aspects, the gels cool spontaneously to room temperature while being purged with carbon dioxide gas.

In certain embodiments, the reaction mixture's molar ratio of phenolic compound to formaldehyde varies from about 1:9 to 9:1.

In certain embodiments, the carbon gel has an average pore size of from about 1.0 to 2.1 nm.

In certain embodiments, the carbon gel has an average area of micropores of from about 0.3 to 1.1% of the total area.

In certain embodiments, the carbon gel has an average area of mesopores of from about 11 to 35% of the total area.

In certain embodiments, the carbon gel has an average area of macropores of from about 63 to 88% of the total area.

In certain embodiments, the carbon gel has an average particle size of from about 0.2 to 6.6 μm.

In certain embodiments, the $I_D/I_G$ ratio of activated carbons is from about 0.82 to 0.90.

In certain embodiments, the carbon gel has an activated carbon yield of at least about 14 to 60% of the mass of the initial gel depending on the reactants' concentrations. In certain embodiments, the carbon gel has an activated carbon yield of at least about 32 to 56% of the mass of the starting gel depending on the dose irradiation dose effect.

In certain aspects and embodiments, the method provides sterilized gel products that are free of initiators, additives, or other undesired species that could contaminate the final gel products and restrict their applications in sensitive fields, such as biomaterials, pharmaceuticals, cosmetics, and the like. In certain embodiments, the novel approach is more environmentally friendly, either in the synthesis process or in the final gel products. In some embodiments, the method is low cost, results in pure and sterilized products, easier mass production, greater environmental friendliness, and uniqueness of gel characteristics compared to those reported in literature. In certain aspects and embodiments, the method provides sterilized gel products that may be useful in sensitive fields, such as biomaterials, pharmaceuticals, cosmetics, and the like. In certain aspects, the method opens a new window of synthesis for xerogels, aerogels and cryogels from their main reactants and their derivatives as well.

BRIEF DESCRIPTION OF THE FIGURES

FIG. 1A illustrates a proposed radiolytic reaction mechanism of water.

FIG. 1B suggested a radiolytic reaction mechanism of RF gels.

FIG. 1C shows the irradiation processing using gamma-rays cell of $^{60}$Co as main source.

FIG. 2 shows FTIR spectra of RFG1 through RFG9 crosslinked at 40 kGy with a dose rate of 0.34 kGy/h.

FIG. 3 shows Raman spectra of RFG1 through RFG9 crosslinked at 40 kGy with a dose rate of 0.34 kGy/h.

FIG. 4 shows Raman intensity ratios ($I_D/I_G$) of RFG1 through RFG9 crosslinked at 40 kGy with a dose rate of 0.34 kGy/h.

FIGS. 5A and 5B show TGA thermograms (FIG. 5A) and DTG thermograms (FIG. 5B) of RFG1 through RFG9 crosslinked at 40 kGy with a dose rate of 0.34 kGy/h.

FIG. 6 shows XRD patterns of RFG1 through RFG9 crosslinked at 40 kGy with a dose rate of 0.34 kGy/h.

FIG. 7 shows SEM photomicrographs of RFG1 through RFG9 crosslinked at 40 kGy with a dose rate of 0.34 kGy/h. The scale bar size is 10 μm.

FIG. 8 shows optical photos of RFG1 through RFG9 crosslinked at 40 kGy with a dose rate of 0.34 kGy/h.

FIG. 9 shows $N_2$ adsorption/desorption isotherms at −196° C. onto RFG1-AC through RFG9-AC.

FIG. 10 shows the cumulative pore volume versus pore width for RFG1-AC through RFG9-AC.

FIGS. 11A, 11B, and 11C show the full x-axis scale of incremental pore volume versus pore width and x-axis in log scale (FIG. 11A), truncated x-axis and zoomed-in scale of 0.6-1.8 nm (FIG. 11B), and truncated x-axis and zoomed-in scale of 2-280 nm (FIG. 11C). Samples are RFG1-AC through RFG9-AC from corresponding gels that were prepared at 40 kGy with a dose rate of 0.34 kGy/h.

FIG. 12 shows the cumulative surface areas versus pore width of RFG1-AC through RFG9-AC from corresponding gels that were prepared at 40 kGy with a dose rate of 0.34 kGy/h.

FIGS. 13A and 13B show the full x-axis scale of incremental surface area versus pore width and x-axis in log scale (FIG. 13A) and truncated x-axis (FIG. 13B) and zoomed-in scale of 0.6-1.8 nm of RFG1-AC through RFG9-AC from gels that were prepared at 40 kGy with a dose rate of 0.34 kGy/h.

DETAILED DESCRIPTION

Provided herein are radiolytic methods for the synthesis of phenolic compound-formaldehyde gels and their derivatives.

Definitions

When referring to the compounds provided herein, the following terms have the following meanings unless indicated otherwise. Unless defined otherwise, all technical and scientific terms used herein have the same meaning as is commonly understood by one of ordinary skill in the art. In the event that there is a plurality of definitions for a term herein, those in this section prevail unless stated otherwise.

The term "aerogel" as used herein includes a gel in which the liquid component has largely or entirely been replaced by a gas phase. In certain embodiments, the aerogel has very low density and low thermal conductivity.

The term "xerogel" as used herein as type of solid-formed gels, which are being prepared through drying slowly at the room temperature with an unconstrained shrinkage. In certain embodiments, the xerogel has high surface area and small pore size.

The term "carbon gel" as used herein includes a porous, three-dimensional form of carbon produced from a gel (e.g., by pyrolysis of the gel).

The term "cryogel" as used herein includes a gel formed in a partially frozen solution.

The term "gel" as used herein includes a porous, three-dimensional network of polymeric compounds. In certain embodiments, a gel is formed by a polymerization reaction in which the monomers react to form a network of interlinking or interconnected chains. In certain embodiments, the pores incorporate a liquid phase (e.g., the solvent used for gel formation).

The term "phenolic compound" as used herein includes di- and trihydroxyaryl groups (preferably, di- and trihydroxybenzenes, such as resorcinol) and mixtures thereof. In certain embodiments, a mixture of di- and trihydroxy compounds are used (e.g., to influence the degree of crosslinking in the final gel).

Reaction Mechanism of Water Radiolysis

The free radicals formed during water radiolysis are highly reactive, for the HO• radical is the most powerful oxidant known to occur in water, while the same is true for the hydrated electron as reductant. Without intending to be bound by theory, the radiolytic process occurs in three main stages taking place on different typical time scales:

1. Physical stage, which is achieved in about 1 fs (10-15 s) after the initial matter-ionizing radiation interaction, consists in energy deposition followed by fast relaxation processes. This leads to the formation of ionized water molecules ($H_2O^+$), excited water molecules ($H_2O^*$) and subexcitation electrons ($e^-$).
2. Physico-chemical stage (10-15-10-12 s), in which numerous processes occur, including ion-molecule reaction (1), dissociative relaxation (2), auto-ionization of excited states, thermalization of sub-excitation electrons (solvation of electrons) (3), hole diffusion, and the like.
3. Chemical stage (10-12-10-6 s), in which the species react in the tracks and then diffuse in solution. They can thus react with each other and also with surrounding molecules in the solute. The track of the particles expands because of the diffusion of radicals and their subsequent chemical reactions. Recombination becomes unimportant after ca. 1 μs for low linear energy transfer radiation.

Without intending to be bound by theory, FIG. 1 shows a suggested radiolytic process of $H_2O$ molecule radiolysis that is induced by the ionizing radiation of γ-rays using °Co as a main source of γ-radiation.

The principal idea depends basically on chemical stage of $H_2O$ radiolysis as shown in Eq.(4):

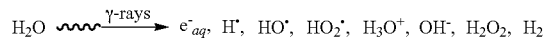

(4)

The radiolytic yield (labeled as G-value) for water decomposition products using γ-ray irradiation at room temperature are 2.7, 0.6, 2.8, 0.45, 0.72, 3.2 0.5 for $e^-_{aq}$, H•, HO•, HO•$_2$, $H_3O^+$, $OH^-$, $H_2O_2$, and $H_2$, respectively. The G-value represents the number of produced or decomposed molecules per 100 eV energy absorbed (or, if the G-values are multiplied by 0.010364, in the SI unit μmol/J).

Reaction Mechanism of Methanol Radiolysis

The products formed when liquid methanol is irradiated are $e^-_{aq}$, H•, HO•, $CH_3^•$, $CH_3OH$, $H_2$, $(CH_2OH)_2$, HCHO, $CH_4$, and CO, respectively and some other minor species. It was reported that the salvation in alcohol is lower than in water. In a methanolic system, the above species are generated primarily as shown in Eq. (5). The G-values of these species are 0.21, 0.11, 0.02, 0.02, 0.28, 0.58, 0.185, 0.043 and 0.013 (μvalue-1), respectively.

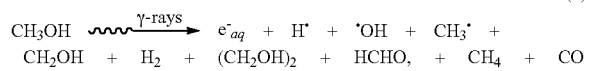

(5)

The reaction of resorcinol with formaldehyde needs a catalyst, such as an acid or base catalyst, to initiate the reaction. Therefore, the presence of $OH^-$ and $H_3O^+$ in Eq. (4) as radiolysis products of $H_2O$ due to exposure to γ-rays, and presence of these radicals in Eq. (4), can change the pH level in the range of 3 to 11. These conditions are enough to initiate the reaction of resorcinol and formaldehyde reactants to produce gels. Further, the produced species in Eq. (5) may change the pH level of resorcinol and formaldehyde reaction media to reach the desired value of initiation for polymerization and gelation reaction.

The existing technology and current practices depend on conventional methods that comprise the main reactants in addition to extra components, such as catalyst, buffer, acid or base to control pH level, and additives. These additives or initiators of reaction can contaminate and poison the final gel products if seeded into the gel structure. In some embodiments, these contaminating materials restrict the applications of the obtained gels such pharmaceuticals, biomaterials, biomaterials, cosmetics, and the like. Moreover, these contaminating materials can have non-environmental-friendly effects. Furthermore, the conventional process requires a relatively long time to complete the polymerization and gelation reactions of the gels.

In certain aspects, the present invention provides one or more advantages over existing technologies and current practices in using only the main reactants without additional chemical species, as are used in the conventional methods. In certain aspects, the present invention provides sterilized and clean gel products, which widens the scope of possible applications and allows better conformity to green chemistry principles. The absence of extra chemical components make the final gel product more suitable for sensitive applications such as biomaterials, biomedical materials, cosmetics, pharmaceutics, and the like, because some of these applications require highly pure and clean final raw materials. Furthermore, the polymerization and crosslinking reactions in this novel method can be significantly faster than the conventional method if a high irradiation rate is used.

In certain aspects and embodiments, the present invention provides a method of making a phenolic compound-formaldehyde gel (e.g., a resorcinol-formaldehyde gel), the method comprising:

preparing a reaction mixture comprising a phenolic compound and formaldehyde; and irradiating the reaction mixture with ionizing radiation, thereby producing the phenolic compound-formaldehyde gel.

In certain aspects and embodiments, the phenolic compound is selected from the group including a dihydroxybenzene (e.g., 1,3-dihydroxybenzene or resorcinol; 2,4-dimethylresorcinol; 2,4-di(hydroxymethyl)resorcinol; 1-methoxy-2,4-dihydroxybenzene), a trihydroxybenzene (e.g., 1,3,5-trihydroxybenzene; 1,2,4-trihydroxybenzene), and mixtures thereof. In certain aspects and embodiments, the phenolic compound is selected from the group including resorcinol, catechol, hydroquinone, and mixtures thereof. In certain aspects and embodiments, the phenolic compound is resorcinol.

In certain aspects and embodiments, the ionizing radiation is gamma radiation. In certain aspects and embodiments, the dose of gamma irradiation ranges from about 10 to 70 kGy (e.g., about 10, 15, 20, 25, 30, 35, 40, 45, 50, 55, 60, 65, or 70 kGy).

In certain aspects and embodiments, the ionizing radiation is produced by a radiation source comprising radioactive $^{60}$Co (for example) as the main source.

In certain aspects and embodiments, the reaction mixture (i.e., for gel formation or polymerization) does not comprise a polymerization initiator, a polymerization catalyst, an acid, a base, or a buffer. In certain aspects and embodiments, the reaction mixture is substantially free of a polymerization initiator or a polymerization catalyst. In certain aspects and embodiments, the reaction mixture is substantially free of an acid, a base, or a buffer.

In certain aspects and embodiments, the reaction mixture does not include a solvent (e.g., is substantially free of a solvent). In certain aspects and embodiments, the reaction mixture for the gel formation or polymerization comprises resorcinol and formaldehyde solution.

In certain aspects and embodiments, the reaction mixture for the gel formation or polymerization comprises water, resorcinol, and formaldehyde. In certain aspects and embodiments, wherein the reaction mixture for the gel formation or polymerization consists essentially of resorcinol, and formaldehyde.

In certain aspects and embodiments, the reaction mixture's ratio of phenolic compound to formaldehyde ranges from about 1:9 to 9:1 (e.g., about 1:9, 1:8, 1:7, 1:6, 1:5, 1:4, 1:3, 1:2, 1:1, 2:1, 3:1, 4:1, 5:1, 6:1, 7:1, 8:1, and 9:1).

In certain aspects and embodiments, the phenolic compound-formaldehyde gel is a xerogel, an aerogel, or a cryogel. In certain aspects and embodiments, the phenolic compound-formaldehyde gel is a xerogel. In certain aspects and embodiments, the phenolic compound-formaldehyde gel is an aerogel. In certain aspects and embodiments, the phenolic compound-formaldehyde gel is a cryogel.

In certain aspects and embodiments, the method further comprises:
waiting for gelation of the reaction mixture (e.g., for 30 min, 1 h, 2 h, or 3 h, depending on the irradiation rate along with the applied dose of irradiation).

In certain aspects and embodiments, gelation of the reaction mixture comprises crosslinking of the phenolic compounds (including resorcinol, catechol, hydroquinone, and mixtures thereof) during the irradiating of the reaction mixture (e.g., 1,3-dihydroxybenzene or resorcinol; 2,4-dimethylresorcinol; 2,4-di(hydroxymethyl)resorcinol; 1-methoxy-2,4-dihydroxybenzene), a trihydroxybenzene (e.g., 1,3,5-trihydroxybenzene; 1,2,4-trihydroxybenzene), and mixtures thereof).

In certain aspects and embodiments, the method further comprises: curing the phenolic compound-formaldehyde gel (e.g., by heating).

In certain aspects and embodiments, curing the phenolic compound-formaldehyde gel comprises heat drying the phenolic compound-formaldehyde gel at about 50° C. for 3 days. In certain aspects and embodiments, the heat drying of the phenolic compound-formaldehyde gel is at about 50° C. (e.g., at about 40, 45, 50, 55, 60, or 65° C.). In certain aspects and embodiments, the heat drying of the phenolic compound-formaldehyde gel is at about 3 days (e.g., 36 h, 48 h, 60 h, 72 h, 84 h, 96 h, or 108 h).

The method of any one of the preceding claims, further comprising: converting the phenolic compound-formaldehyde gel to a carbon gel.

In certain aspects and embodiments, converting the resorcinol-formaldehyde gel to a carbon gel comprises heating up to 500° C. (e.g., 350, 375, 400, 425, 450, 475, 500, 525, or 550° C.), keeping this temperature constant for about 3 hours, and then cooling spontaneously to room temperature while purging with an inert gas (e.g., nitrogen gas) throughout the process. In certain aspects and embodiments, the purging with an inert gas (e.g., nitrogen) is at a gas flow rate of about 100 cm$^3$/min.

In certain aspects and embodiments, converting the carbonized resorcinol-formaldehyde gel to an activated carbon gel comprises heating up to 700° C. (e.g., 550, 575, 600, 625, 650, 675, 700, 725, or 750° C.), keeping this temperature constant for 1 hour and then cooling spontaneously to room temperature while purging with carbon dioxide gas (for example) throughout the process. In certain aspects and embodiments, the purging with carbon dioxide gas is at a gas flow rate of about 150 cm$^3$/min.

In certain aspects and embodiments, the activated carbon gel has an average pore size of from about 1.0 to 2.1 nm (e.g., about 0.8, 0.9, 1.0, 1.1, 1.2, 1.3, 1.4, 1.5, 1.6, 1.7, 1.8, 1.9, 2.0, 2.1, 2.2, 2, 3, or 2.4 nm).

In certain aspects and embodiments, the activated carbon gel has an average area of micropores of from about 0.3 to 1.1% of the total area (e.g., about 0.3, 0.4, 0.5, 0.6, 0.7, 0.8, 0.9, 1.0, or 1.1%).

In certain aspects and embodiments, the activated carbon gel has an average area of mesopores of from about 11 to 35% of the total area (e.g., about 10, 11, 12, 13, 14, 15, 16, 17, 18, 19, 20, 21, 22, 23, 24, 25, 26, 27, 28, 29, 30, 31, 32, 33, 34, 35, 36, 38, 39, or 40%).

In certain aspects and embodiments, the activated carbon gel has an average area of macropores of from about 63 to 88% of the total area (e.g., about 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90%).

In certain aspects and embodiments, the activated carbon gel has an average particle size of from about 0.20 to 6.60 μm (e.g., about 0.15, 0.18, 0.20, 0.25, 0.30, 0.35, 0.40, 0.45, 0.50, 0.55, 0.60, 0.65, 0.70, 0.75, 0.80, 0.85, 0.9, 1.1, 1.15, 1.20, 1.25, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.2, 3.4, 3.6, 3.8. 4.0, 4.2, 4.4, 4.6, 4.8, 5.0, 5.2, 5.4, 5.6, 5.8, 6.0, 6.2, 6.4, 6.6, 6.8, or 7.0 μm).

In certain aspects and embodiments, the $I_D/I_G$ ratio of activated carbons is from about 0.82 to 0.90 (e.g., about 0.80, 0.81, 0.82, 0.83, 0.84, 0.85, 0.86, 0.87, 0.88, 0.89, 0.90, 0.91, or 0.92).

In certain aspects and embodiments, the activated carbon gel has an activated carbon % of at least about 14 to 60% (e.g., depending on the applied composition and at an irradiation dose of 40 kGy) (e.g., about 10, 11, 12, 13, 14, 15, 16, 17, 18, 19, 20, 21, 22, 23, 24, 25, 26, 27, 28, 29, 30, 31, 32, 33, 34, 35, 36, 38, 39, 40, 41, 42, 43, 44, 45, 46, 47, 48, 49, 50, 51, 52, 53, 54, 55, 56, 57, 58, 59, 60, 61, 62, 63, 64, or 65%).

In certain aspects and embodiments, the activated carbon gel has an activated carbon % of at least about 32 to 56% (e.g., depending on the irradiation dose at a fixed composition) (e.g., about 27, 28, 29, 30, 31, 32, 33, 34, 35, 36, 38, 39, 40, 41, 42, 43, 44, 45, 46, 47, 48, 49, 50, 51, 52, 53, 54, 55, 56, 57, 58, 59, 60, 61, or 62%).

In certain aspects and embodiments, the present invention is useful for the preparation of resorcinol/formaldehyde gels. More broadly, this novel technique can be applied in the synthesis of xerogels, aerogels and cryogels from resorcinol/formaldehyde or their related family of main reactants, which widens the scale of gel products and their applications.

EXAMPLES

As used herein, the symbols and conventions used in these processes, schemes and examples, regardless of whether a particular abbreviation is specifically defined, are consistent with those used in the contemporary scientific literature, for example, the Journal of the American Chemical Society or the Journal of Biological Chemistry. Specifically, but without limitation, the following abbreviations may be used in the examples and throughout the specification: g (grams); mg (milligrams); mL (milliliters); μL (microliters); mM (millimolar); μM (micromolar); Hz (Hertz); MHz (megahertz); mmol (millimoles); hr or hrs (hours); min (minutes); MS (mass spectrometry); ESI (electrospray ionization); TLC (thin layer chromatography); HPLC (high pressure liquid chromatography); THF (tetrahydrofuran); CDCl$_3$ (deuterated chloroform); AcOH (acetic acid); DCM (dichloromethane); DMSO (dimethyl sulfoxide); DMSO-d$_6$ (deuterated dimethyl sulfoxide); EtOAc (ethyl acetate); MeOH (methanol); and BOC (t-butyloxycarbonyl).

For all of the following examples, standard work-up and purification methods known to those skilled in the art can be utilized. Unless otherwise indicated, all temperatures are expressed in ° C. (degrees Centigrade). All reactions are conducted at room temperature unless otherwise noted. Synthetic methodologies illustrated herein are intended to illustrate the applicable chemistry through the use of specific examples, not to restrict the full scope of the disclosure.

Example 1: Preparation of Compounds 1, 1a and 1b

This example provides a method of synthesis for Compounds 1, 1a, and 1b.

Proposed Reaction Mechanism of Resorcinol/Formaldehyde Gel

Without intending to be limited by theory, FIG. 1A illustrates a proposed reaction mechanism of resorcinol with formaldehyde reactants in the presence of radiolysis species that initiate the polymerization and gelation reaction processes.

Preparation of Gels

The synthesis of resorcinol-formaldehyde gels (RFGs) is carried out via the exposure to γ-rays in the range of 10 to 70 kGy with a dose rate of 0.34 kGy/h at room temperature (e.g., 40 kGy for Table 2). A Gamma cell $^{60}$Co apparatus (e.g., supplied from Atomic Energy of Canada LTD, Kanata, Ontario-Canada, Model GC-220, Serial No 234, Type B(U)) was used to generate the γ-rays. A schematic of the apparatus and sample location is shown in FIG. 1C. The effects of irradiation dose and RFG composition on the produced RFG samples were evaluated. After irradiation the extracted gels were put in an oven at 50±1° C. for 3 days to dry.

The synthesis details regarding the effect of radiation dose and the effect of reactants' composition on the product RFGs are listed in Tables 1 and 2, respectively.

TABLE 1

Effect of radiation dose (at dose rate 0.34 kGy/h) on RFGs and RFG-ACs.

| RFG | RFG-AC | R:F | R:W | R (g) | F (mL) | Dose (kGy) | Product |
|---|---|---|---|---|---|---|---|
| RFG1 | RFG1-AC | 0.90 | 0.40 | 12.44 | 10.19 | 10 | high viscous gel |
| RFG1 | RFG1-AC | 0.90 | 0.40 | 12.44 | 10.19 | 20 | solid gel |
| RFG1 | RFG1-AC | 0.90 | 0.40 | 12.44 | 10.19 | 30 | solid gel |
| RFG1 | RFG1-AC | 0.90 | 0.40 | 12.44 | 10.19 | 40 | solid gel |
| RFG1 | RFG1-AC | 0.90 | 0.40 | 12.44 | 10.19 | 50 | solid gel |
| RFG1 | RFG1-AC | 0.90 | 0.40 | 12.44 | 10.19 | 60 | solid gel |
| RFG1 | RFG1-AC | 0.90 | 0.40 | 12.44 | 10.19 | 70 | solid gel |
| RFG5 | RFG5-AC | 0.50 | 0.24 | 12.44 | 17.40 | 10 | low viscous gel |
| RFG5 | RFG5-AC | 0.50 | 0.24 | 12.44 | 17.40 | 20 | high viscous gel |
| RFG5 | RFG5-AC | 0.50 | 0.24 | 12.44 | 17.40 | 30 | solid gel |
| RFG5 | RFG5-AC | 0.50 | 0.24 | 12.44 | 17.40 | 40 | solid gel |
| RFG5 | RFG5-AC | 0.50 | 0.24 | 12.44 | 17.40 | 50 | solid gel |
| RFG5 | RFG5-AC | 0.50 | 0.24 | 12.44 | 17.40 | 60 | solid gel |
| RFG5 | RFG5-AC | 0.50 | 0.24 | 12.44 | 17.40 | 70 | solid gel |
| RFG9 | RFG9-AC | 0.10 | 0.04 | 12.44 | 91.68 | 10 | liquid solution |
| RFG9 | RFG9-AC | 0.10 | 0.04 | 12.44 | 91.68 | 20 | low viscous gel |
| RFG9 | RFG9-AC | 0.10 | 0.04 | 12.44 | 91.68 | 30 | high viscous gel |
| RFG9 | RFG9-AC | 0.10 | 0.04 | 12.44 | 91.68 | 40 | solid gel |
| RFG9 | RFG9-AC | 0.10 | 0.04 | 12.44 | 91.68 | 50 | solid gel |
| RFG9 | RFG9-AC | 0.10 | 0.04 | 12.44 | 91.68 | 60 | solid gel |
| RFG9 | RFG9-AC | 0.10 | 0.04 | 12.44 | 91.68 | 70 | solid gel |

TABLE 2

Effect of reactants composition of RFGs and their consequent RFG-ACs.

| RFG | RFG-AC | R:F | R:W | R(g) | F(mL) | Dose (kGy) | Product |
|---|---|---|---|---|---|---|---|
| RFG1 | RFG1-AC | 0.90 | 0.40 | 12.44 | 10.19 | 40 | solid gel |
| RFG2 | RFG2-AC | 0.80 | 0.35 | 12.44 | 11.46 | 40 | solid gel |
| RFG3 | RFG3-AC | 0.70 | 0.31 | 12.44 | 13.10 | 40 | solid gel |
| RFG4 | RFG4-AC | 0.60 | 0.26 | 12.44 | 15.28 | 40 | solid gel |
| RFG5 | RFG5-AC | 0.50 | 0.24 | 12.44 | 17.40 | 40 | solid gel |
| RFG6 | RFG6-AC | 0.40 | 0.19 | 12.44 | 21.74 | 40 | solid gel |
| RFG7 | RFG7-AC | 0.30 | 0.14 | 12.44 | 28.99 | 40 | solid gel |
| RFG8 | RFG8-AC | 0.20 | 0.09 | 12.44 | 45.84 | 40 | solid gel |
| RFG9 | RFG9-AC | 0.10 | 0.04 | 12.44 | 91.68 | 40 | solid gel |

Radiolytic gelation was made at 40 kGy with a dose rate of 0.34 kGy/h.

Carbonization and Activation Processes

The dried RFG sample was placed in a ceramic boat inside a programmable electric-heated tube furnace (Nabertherm GmbH, Germany), through which nitrogen gas was passed with a continuous flow rate of 100 cm$^3$/min at 0.3 bar. The tube furnace was first kept at room temperature for 40 minutes to guarantee that air is fully purged with the flowing N$_2$ gas in presence of the RFG sample. Then, the furnace was heated up to a temperature of 500° C. at a heating rate of 10° C./minute. The furnace was maintained at 500° C. for 3 h and then allowed to cool spontaneously to room temperature under flowing nitrogen.

After cleaning the tube furnace comprehensively from carbonization process remains, the carbonized gel was activated in the same tube furnace with a carbon dioxide gas flow of 150 cm³/min at 0.3 bar, instead of nitrogen gas flow. The sample was again heated up to 700° C. at a rate of 10° C./minute, maintained at 700° C. for 1 h, and then allowed to cool to room temperature while still flowing carbon dioxide.

After the carbonization and activation processes, the activated products were designated RFG activated carbons and denoted as RFG-AC with a corresponding code number related to the used recipe (see, e.g., Tables 1 and 2).

Characterization

FT-Raman spectra were measured by utilizing a Bruker FT-Raman spectrometer of type RFS 100/S that is attached to a Bruker-IFS 66/S spectrometer. Fourier transform infrared (FTIR) spectroscopy (NICOLET, iS10, Thermo-Scientific) was used to examine the structure of the synthesized samples. X-ray diffraction (XRD) measurements were proceeded by Miniflex II Benchtop XRD apparatus, manufactured by Rigaku Corporation, Japan. The 2θ scan data were collected at 0.05° intervals over the range of 5 to 80 at a scan rate of 0.05°/min. The morphology of RFG and RFG-AC samples were scanned by SEM FEI Nova™ nanoscanning electron microscopy 450 (Nova NanoSEM). The chemical compositions of RFG and RFG-AC samples were studied by energy-dispersive X-ray spectroscopy (EDX) connected to Nova NanoSEM. Thermogravimetric analyses (TGA) were conducted by a PerkinElmer Pyris6 TGA analyzer under nitrogen gas in the range of 30 to 800° C. with heating rate 10° C./min. A Micromeritics ASAP2420® Accelerated Surface Area and Porosimetry Analyzer System, with an enhanced micropore capability (utilizing 1-Torr pressure transducer), was utilized to investigate the pore structures of RFG-AC samples through the adsorption/desorption isotherms of nitrogen at −196° C. Before the adsorption measurements, RFG-AC samples were degassed in-situ for 24 h at 150° C. and 200° C., respectively under vacuum ($1 \times 10^{-4}$ Pa). The pore structures of RFG-AC samples were attained by built-in calculations depending on the density functional theory (DFT).

The instant inventive disclosure is fully different from those already reported in the literature on synthesis of resorcinol/formaldehyde gels or their derivative reactants and their subsequent carbons either in literature or in commercial products. The resorcinol/formaldehyde gels or their derivative family found in literature or global market (as commercial products) are manufactured by conventional methods that contain catalyst, initiators, additives, buffer, etc. These initiators or additives prohibit and restrict the applications especially in sensitive fields such as biomaterials, pharmaceutics, biomaterials, biomedical applications, cosmetics, etc., which require materials that are highly pure and clean from initiators or additives that might be trapped in their structure. This novel approach is characterized by using only the main reactants required and thus producing highly pure, clean, and sterilized gel products. The process of synthesis is environmentally friendly. Further, the manufactured gels and their subsequent carbons are unique and may widen the range of their applications.

A detailed technical description of the process used in this invention has been provided in the previous section.

FIG. 2 shows the FTIR spectra of RFGs of different gel samples, in which the broadband at 3250 cm⁻¹ is a characteristic of OH stretching vibrations in phenol. Absorption bands at 2939 and 1440 cm⁻¹ are associated with $CH_2$ stretching. The absorption band at 1608 cm⁻¹ was assigned to the aromatic ring stretching vibrations. The bands at 1280 and 1090 cm⁻¹ confirm the methylene ether C—O—C linkage stretching between resorcinol molecules (phenyl rings), as expected in the polycondensation reaction between resorcinol and formaldehyde.

FIG. 3 describes the Raman spectra of RFG samples crosslinked radiolytically using γ-rays at two main bands. The first band at 1355 cm⁻¹, named as 'disorder-induced' ($I_D$) band, commonly ascribes the lack of long-range translation symmetry in disordered carbons atoms (see Gholipour-Ranjbar H., M. R. Ganjali, P. Norouzi, and H. R. Naderi, "Functionalized graphene aerogel with p-phenylenediamine and its composite with porous $MnO_2$: investigating the effect of functionalizing agent on supercapacitive performance," J. Mater. Sci. Mater. Electron., 27 (2016), pp. 10163-10172). The second (graphitic) band appearing at 1591 cm⁻¹ is named as ($I_G$). It is ascribed to a Raman-allowed $E_{2g}$ resulting from 'in plane' displacement of carbons strongly coupled in the hexagonal sheets, and is characteristic of $sp^2$-hybridized C—C bonds in a two-dimensional hexagonal lattice (see M. Zafra, P. Lavela, C. Macias, G. Rasines "Electrosorption of environmental concerning anions on a highly porous carbon aerogel," J. Electroanal. Chem., 708 (2013), pp. 80-86).

FIG. 4 exposes the Raman intensity ratio of the $I_D$ and $I_G$ bands (denoted by $I_D/I_G$). This $I_D/I_G$ ratio can be used to evaluate the graphitic nature of the gel sample. It was seen from the results that the RFG6 represents the highest graphic order (lowest $I_D/I_G$ ratio) among samples whereas RFG9 represents the lowest graphic order (highest $I_D/I_G$ ratio) among samples. Further, the sequential order of these gel samples are RFG6>RFG3≈RFG8>RFG4>RFG1>RFG2≈RFG5≈RFG7>RFG9. Overall, the $I_D/I_G$ ratio was almost constant in the range from 0.70 to 0.80. Without intending to be bound by theory, this small fluctuation in $I_D/I_G$ values may be due to the competition between the two processes of high degradation and crosslinking. Further, this may be due to the random effect of γ-rays.

FIG. 5A exhibits TGA thermograms of RFG1 through RFG9 samples crosslinked at 40 kGy with a of dose rate of 0.34 kGy/h. The TGA curves were collected in the range from room temperature to 847° C. Overall, there are three major stages of weight losses, these ranges were at temperatures between 40-172° C., 172-439° C. and 439-793° C. The derivative thermogravimetric (DTG) (see FIG. 5B) exposed these three stages of thermal decompositions for all RFG samples. The peaks of weight losses in the first stage occurred at 101, 125, 101, 93, 84, 70, 89, 90 and 85° C., for RFG1 through RFG9, respectively. The weight loss peaks in the second stage are at 380, 347, 380, 380, 380, 385, 371, 383 and 383° C., for RFG1 through RFG9, respectively. Further, the weight loss peaks in the third stage are at 612, 620, 612, 603, 609, 576, 598, 602 and 602° C., for RFG1 through RFG9, respectively. The peaks at these three stages correspond, respectively, to the removal of adsorbed moisture, solvent removal/decomposition, and carbonization of gels. Without intending to be bound by theory, the gels' decomposition include the breakage of C—O and C—H bonds at 347-385° C. and 603-612° C., respectively. Briefly, it can be concluded that the differences in thermal stability are due the differences in the ratio between resorcinol and formaldehyde as main reactants.

FIG. 6 exhibits the XRD patterns of RFG1 through RFG9 crosslinked at 40 kGy with a dose rate of 0.34 kGy/h. All samples displayed similar patterns with a broad peak at 2θ=20°. This indicates that these gel samples have an amorphous structure. Further, the intensities of these peaks differ from one gel sample to another. Overall, the highest and lowest intensities are 1814 and 1379 cps for the corresponding RFG2 and RFG6 samples, respectively. Moreover, the intensity order of these gel samples are as RFG2>RFG1>RFG5>RFG7>RFG9>RFG3>RFG8>RFG4>RFG6.

FIG. 7 shows the SEM photomicrographs of RFG1 through RFG9 crosslinked at an irradiation dose of 40 kGy with a dose rate of 0.34 kGy/h. The morphologies of RFG1 and RFG2 samples indicate porous structures, where the pore sizes in RFG1 are larger than those in RFG2. Overall, the morphologies of all RFG samples are different and unique from each other.

FIG. 8 shows the optical photos of RFG1 through RFG9 crosslinked at 40 kGy with a dose rate of 0.34 kGy/h. The shapes of all gel samples tested are monolithic, and the colours of samples are red-brown. The volumes of samples decrease (due to shrinkage upon drying) by increasing the sample number (i.e., by decreasing the R:F ratio).

Elemental Analysis

The elemental analysis values listed in Table 3 indicate that the percentages of carbon and oxygen vary slightly from RFG1 to RFG9. On the other hand, while the percentage of activated carbons (i.e., the mass of activated carbon produced relative to the mass of the starting gel) decreases significantly by increasing the formaldehyde in the feeding solution of reaction (i.e., by increasing the sample number).

TABLE 3

EDX elemental analyses and percentage of conversion (to activated carbon) for the samples RFG1 through RFG9 crosslinked at 40 kGy with a dose rate of 0.34 kGy/h.

| Sample | Elemental analysis | | Activated carbon (%) |
|---|---|---|---|
| | Carbon (wt. %) | Oxygen (wt. %) | |
| RFG1 | 88.0 | 12.0 | 60.4 |
| RFG2 | 87.5 | 12.6 | 58.4 |
| RFG3 | 86.7 | 13.3 | 57.9 |
| RFG4 | 84.4 | 15.6 | 42.0 |
| RFG5 | 84.5 | 15.5 | 49.1 |
| RFG6 | 84.8 | 15.2 | 48.6 |
| RFG7 | 84.6 | 15.4 | 45.6 |
| RFG8 | 85.4 | 14.6 | 28.8 |
| RFG9 | 85.2 | 14.8 | 13.8 |

Table 4 shows the effect of the irradiation dose an reaction composition on the percentage of outcome activated carbons. Overall, the percentage of activated carbon of RFG1 decreases by increasing radiation dose, as in both RFG5 and RFG9 the percentage of activated carbons decreases by increasing the radiation dose. Furthermore, the percentage of activated carbons decreases by increasing formaldehyde solution into the reaction media (i.e., increasing sample number), especially at high radiation dose.

TABLE 4

Effect of irradiation dose on the percentage of conversion (to activated carbon) for selected RFG samples.

| | Activated carbon (%) | | | | | |
|---|---|---|---|---|---|---|
| | Radiation Dose (kGy) | | | | | |
| Sample | 20 | 30 | 40 | 50 | 60 | 70 |
| RFG1 | 41.1 | 43.7 | 46.0 | 31.7 | 57.6 | 49.1 |
| RFG5 | 55.5 | 46.3 | 46.0 | 45.7 | 45.4 | 40.9 |
| RFG9 | NA | NA | 45.7 | 36.0 | 35.3 | 34.6 |

Table 4 shows the effect of the irradiation dose and reaction composition on the percentage of outcome activated carbons. Overall, the percentage of activated carbon of RFG1 decreases by increasing radiation dose, as in both RFG5 and RFG9 the percentage of activated carbons decreases by increasing the radiation dose. Furthermore, the percentage of activated carbons decreases by increasing formaldehyde solution into the reaction media (i.e., increasing sample number), especially at high radiation dose.

FIG. 9 shows the adsorption/desorption isotherms of N2 at −196° C. onto RFG1-AC through RFG9-AC. The isotherms on all samples are of type-IV due to the presence of hysteresis loops that indicate the presence of mesopores and macropores. According to the IUPAC classification, the isotherms fall under Type-IV with an H4-type hysteresis. A steep increase of volume adsorbed at low relative pressure (P/PO) is an indication of microporous structure.

Without intending to be bound by theory, this is due to the pore condensation process in which gas condenses to a liquid-like phase in pores at a pressure less than the saturation pressure P/PO of the bulk fluid. The nature of the adsorption process in these samples is monolayer/multilayer adsorption. The monolayer of the adsorbate is formed at low pressure, while the low slope region in the middle of the isotherm refers to the formation of the first few multilayers. The isotherms show lower adsorption capacity at low pressure, which afterwards increase with increasing pressure. Therefore, these results indicate to that the RFG1-AC through RFG9-AC samples have little micro-porosity and more of mesopores and macropores.

This conclusion agrees with the results listed in Table 5, which shows that for all samples in the table, mesopores are in the order of ~10-30% and macropores in the order of ~70 to 90%. Table 5 also shows that both the total pore volume and total surface area increase slightly by increasing the amount of formaldehyde in the matrix of the RFG used to produce the activated carbon (i.e., with increasing sample number). The average pore width increases slightly by increasing the amount of formaldehyde in the structure of obtained activated carbon. There is a general trend that the percentages of micropores increase slightly by increasing the amount of formaldehyde, but it remains up to ~1%. The mesopores increase when increasing the amount of formaldehyde, where they increase from 11% to 28% when comparing RFG1-AC to RFG9-AC. On the other hand, macropores decreased when increasing the amount of formaldehyde where they drop from 88% to 71% when comparing RFG1-AC to RFG9-AC. Consequently, the data suggest that the structures of these activated carbon samples forms three types of pores, which have a majority of macropores followed by mesopores and a minimal extent of micropores.

FIG. 10 exhibits the relationship between the pore widths and cumulative pore volumes of RFG1-AC through RFG9-AC samples. Overall, it is seen that the cumulative pore volume increases by increasing the pore widths. The cumulative pore volume of RFG1-AC increases up to 0.134 cm$^3$/g for the corresponding pore width of 1.8 nm and then then levels off. The cumulative pore volume of RFG2-AC increases up to 0.141 cm$^3$/g for the corresponding pore width of 1.29 nm and then levels off. The cumulative pore volume of RFG3-AC increases up to 0.130 cm$^3$/g for corresponding pore width of 1.1 nm and then levels off. The cumulative pore volume of RFG4-AC increases up to 0.179 cm$^3$/g for the corresponding pore width of 1.3 nm then levels off. The cumulative pore volume of RFG5-AC increases up to 0.088 cm$^3$/g for the corresponding pore width of 1.4 nm and then levels off. The cumulative pore volume of RFG6-AC increases through the whole range up to 0.216 cm³/g for the corresponding pore width up to 252.6 nm. The cumulative pore volume of RFG7-AC increases through the whole range up to 0.359 cm³/g for the corresponding pore width up to 172.1 nm. The cumulative pore volume of RFG8-AC increases through the whole range up to 0.217 cm³/g for the corresponding pore width up to 117.2 nm. The cumulative pore volume of RFG9-AC increases through the whole range up to 0.295 cm³/g for the corresponding pore width of 159.4 nm.

FIGS. 11A, 11B, and 11C display the relationship between the incremental pore volume and pore width of RFG1-AC through RFG9-AC. FIG. 11A represents the full scale of incremental pore volume against pore size, while FIGS. 11B and 11C are presented with more convenient scales for clarity and to avoid overcrowding. FIG. 11B shows that RFG1-AC has two peaks at 0.8 and 1.1 nm for the corresponding incremental pore volumes of 0.009 and 0.058 cm³/g and with no peaks seen in FIG. 11C. RFG2-AC has only one peak at ~1 nm for the corresponding incremental pore volume of 0.084 cm³/g as shown in FIG. 11B and with no peaks seen in FIG. 11C. RFG3-AC has only one peak at 1.1 nm for the corresponding incremental pore volume of 0.105 cm³/g and with no peaks seen in FIG. 11C. FIG. 11B shows that RFG4-AC has three peaks at 0.8, 1.0 and 1.2 nm for the corresponding incremental pore volumes of 0.020, 0.027, 0.037 and 0.054 cm³/g, respectively. Further, a small peak was observed in FIG. 11C for RFG4-AC at 14.8 nm with the corresponding incremental pore volume of 0.008 cm³/g. RG5-AC shows two peaks at 1.1 and 1.3 nm for the corresponding incremental pore volumes of 0.021, 0.017 and 0.020 cm³/g, respectively. FIG. 11C shows that the RFG5-AC shows two other peaks at 13.7 and 216.0 nm for the corresponding incremental pore volumes of 0.004 and 0.002 cm³/g, respectively. RFG6-AC has two peaks observed from FIG. 11B at 1.2 and 1.5 nm with the corresponding incremental pore volumes of 0.052 and 0.028 cm³/g, respectively. It also shows two peaks in FIG. 11C, one of them is broad peaking at 50.4 nm and the other is at 117.2 nm with the corresponding incremental pore volumes of 0.003 and 0.029 cm³/g, respectively. RFG7-AC presents three peaks in FIG. 11B at 0.7, 1.1 and 1.3 nm with the corresponding incremental pore volumes of 0.039, 0.084 and 0.022 cm³/g, respectively. In FIG. 11C, RFG7-AC reveals five peaks at 21.6, 68.5, 93.1, 117.1, 147.6 nm with the corresponding incremental pore volumes of 0.006, 0.007, 0.006, 0.003 and 0.002 cm³/g, respectively. It exhibits two peaks at 0.8 and 1.1 nm with the corresponding incremental pore volumes of 0.014 and 0.084 cm³/g, respectively. Further, FIG. 11C shows that RFG8-AC presents seven peaks are at 23.4, 31.8, 40.0, 50.4, 68.5, 79.9 and 108.6 nm with the corresponding incremental pore volumes of 0.019, 0.002, 0.004, 0.003, 0.002, 0.003 and 0.002 cm³/g, respectively. RGF9-AC refers to four peaks in FIG. 11B at 0.7, 0.8, 1.1 and 1.3 nm with the corresponding incremental pore volumes of 0.043, 0.012, 0.05 and 0.028 cm³/g, respectively. Moreover, the same sample of RFG9-AC in FIG. 11C shows six peaks at 31.8, 50.4, 68.5, 79.9, 117.2 and 147.6 nm with the corresponding incremental pore volumes of 0.004, 0.007, 0.0037, 0.004, 0.003 and 0.003 cm³/g, respectively.

FIG. 12 shows the effect of pore width on the cumulative surface area of RFG1-AC through RFG9-AC. Overall, the cumulative surface area increases by increasing pore width. The cumulative surface area of RFG1-AC increases by increasing pore width up to 31.4 m²/g for the corresponding pore size of 0.8 nm, then levels off, and then increases again up to 254.9 m²/g with the corresponding pore width of 1.1 nm until it saturates at that value. The cumulative surface area of RFG2-AC increases with increasing pore width up to 270.8 m²/g at the corresponding pore width of 1.1 nm and then levels off at the same value. The cumulative surface area of RFG3-AC increases with increasing pore width up to 241 m²/g at the corresponding pore width of 1.1 nm and then levels off at the same value. The cumulative surface area of RFG4-AC increases with increasing pore width up to 83 m²/g at the corresponding pore width of 0.8 nm, levels off, and then increases again up to 321 m²/g at the corresponding pore width of 1.3 nm until it again levels off. The cumulative surface area of RFG5-AC increases with increasing pore width up to 122.4 m²/g at the corresponding pore width of 1.3 nm and then levels off. The cumulative surface area of RFG6-AC increases with increasing pore width up to 180.3 m²/g at the corresponding pore width of 1.2 nm, followed by an increase up to 245.4 m²/g for the corresponding pore width of 1.5 nm until it again levels off. The cumulative surface area of RFG7-AC increases with increasing pore width up to 339.5 m²/g for the corresponding pore width of 1.4 nm and then levels off. The cumulative surface area of RFG8-AC increases with increasing pore width up to 50.4 m²/g for the corresponding pore width of 0.8 nm, increases again up to 335 m²/g at the corresponding pore width of 1.2 nm, and then levels off. The cumulative surface area of RFG9-AC increases with increasing pore width up to 211 m²/g at the corresponding pore width of 0.8 nm, followed by another increase again up to 417 m²/g at the corresponding pore width of 3.4 nm, and then levels off.

FIGS. 13A and 13B show the incremental surface area versus pore width of RFG1-AC through RFG9-AC. FIG. 13A displays the full scale of pore width (0-500 nm), while FIG. 13B shows data only in the range from 0.6 to 1.8 nm for clarity and for avoiding the overcrowding of curves into one graph. FIG. 13B also shows that incremental surface areas of RFG1-AC exposes two main peaks at 24.4 and 106.8 m²/g at the corresponding pore widths of 0.8 and 1.1 nm, respectively. The incremental surface areas of RFG2-AC exposes one main peak at 122.2 m²/g at the corresponding pore width 1.1 nm. RFG3-AC shows only one main peak at 194.03 m²/g for the corresponding pore width 1.1 nm. RFG4-AC shows three peaks at 50.5, 54.2 and 92.8 m²/g for the corresponding pore width 0.8, 1.0, and 1.2 nm, respectively. RFG5-AC indicates to two peaks at 38.6 and 32.1 m²/g for the corresponding pore width 1.1 and 1.3 nm, respectively. RFG6-AC indicates to two peaks at 89.14 and 37.8 m²/g for the corresponding pore width 1.2 and 1.5 nm, respectively. RFG7-AC has three peaks at 10.8, 155.3 and 35.7 m²/g for the corresponding pore width 0.7, 1.1 and 1.3 nm, respectively. RFG8-AC shows two peaks at 35 and 157.1 m²/g for the corresponding pore width 0.8 and 1.1 nm, respectively. RFG9-AC exposes four peaks at 128.2, 31.2, 95.2 and 45.3 m²/g for the corresponding pore widths of 0.7, 0.8, 1.1 and 1.3 nm, respectively.

The results listed in Table 5 show that $I_D/I_G$ tends to increase with increased formaldehyde in the preparation reaction media. A detailed analysis indicates that $I_D/I_G$ increases for RFG2-AC and varies for RFG6-AC to RFG9-AC. This extent of distortion behaviour in the sample is due to the random reaction with γ-rays, which affects the formation of structure during the synthesis process.

TABLE 5

Pore characteristics and elemental analysis of RFG1-AC through RFG9-AC samples.

| sample | $V_{Total}{}^a$ (cm$^3$/g) | $S_{total}{}^a$ (m$^2$/g) | Average$^b$ pore size (nm) | Average$^b$ micropore size (%) | Average$^b$ mesopore size (%) | Average$^b$ macropore size (%) |
|---|---|---|---|---|---|---|
| RFG1-AC | 0.134 | 254.9 | 1.0 | 0.3 | 11.2 | 88.4 |
| RFG2-AC | 0.141 | 270.8 | 1.0 | 0.5 | 16.5 | 83.0 |
| RFG3-AC | 0.130 | 241.0 | 1.1 | 0.3 | 11.2 | 88.4 |
| RFG4-AC | 0.179 | 321.0 | 1.1 | 0.5 | 16.5 | 83.0 |
| RFG5-AC | 0.088 | 122.4 | 1.4 | 0.4 | 17.8 | 81.8 |
| RFG6-AC | 0.216 | 245.4 | 1.8 | 0.6 | 17.8 | 81.7 |
| RFG7-AC | 0.359 | 339.5 | 2.1 | 0.8 | 26.1 | 73.1 |
| RFG8-AC | 0.217 | 334.9 | 1.3 | 1.1 | 35.5 | 63.4 |
| RFG9-AC | 0.295 | 417.2 | 1.4 | 0.9 | 28.2 | 70.9 |

| Sample | Average particle size$^c$ (μm) | N$_2$ adsorption capacity$^d$ (mmol/g) | $I_D/I_G$ ratio | EDX elemental analysis Carbon (wt. %) | Oxygen (wt. %) |
|---|---|---|---|---|---|
| RFG1-AC | 6.6 | 4.6 | 0.84 | 98.2 | 1.8 |
| RFG2-AC | 0.4 | 5.1 | 0.86 | 98.9 | 1.1 |
| RFG3-AC | 1.4 | 4.6 | 0.82 | 99.0 | 1.1 |
| RFG4-AC | 0.4 | 6.2 | 0.83 | 98.1 | 1.9 |
| RFG5-AC | 0.7 | 2.9 | 0.86 | 98.9 | 1.1 |
| RFG6-AC | 0.3 | 7.1 | 0.87 | 99.0 | 1.0 |
| RFG7-AC | 0.2 | 12.0 | 0.85 | 99.0 | 1.1 |
| RFG8-AC | 0.3 | 7.7 | 0.90 | 96.8 | 3.2 |
| RFG9-AC | 0.2 | 10.2 | 0.87 | 96.9 | 3.1 |

$^a$Values derived from DFT,
$^b$calculated based on incremental surface area,
$^c$snatched from Micromeritics summary sheet, and
$^d$ Maximum amount of N$_2$ gas adsorbed at −196° C.

CONCLUSIONS

In certain embodiments, this invention presents a novel route to synthesize gels (e.g., resorcinol/formaldehyde gels and their gel derivatives) and their subsequent carbons by using the gamma-irradiation technique of $^{60}$Co as the main source of γ-rays. This novel route is featured by using only the main reactants, without any additives such as catalysts or buffers, in a fast reaction process that depends on the rate of irradiation dose and can be used in synthesis of other gels. This makes this process friendlier to the environment and results in uncontaminated products that can be very useful in sensitive applications such as biomaterials, pharmaceuticals, biomedical materials, cosmetics, and the like. Furthermore, this route is easy to be up-scaled for mass production. Different compositions of resorcinol and formaldehyde reactants were used to synthesize the corresponding gels via exposing these reactants to different irradiation doses. Moreover, the activated carbon derivatives of these gels were prepared. Various characterization techniques were used to characterize the outcome products (both gels and activated carbons). The techniques confirmed that resorcinol/formaldehyde gels and their subsequent activated carbons were successfully prepared in a wide range of irradiation doses and ingredient compositions. Consequently, the use of γ-rays to produce resorcinol/formaldehyde gels (e.g., xerogels, aerogels, cryogels, and their related starting materials of same family) and their subsequent activated carbon are possible.

All publications, patents, and patent applications cited in this specification are herein incorporated by reference as if each individual publication, patent, or patent application were specifically and individually indicated to be incorporated by reference. While the claimed subject matter has been described in terms of various embodiments, the skilled artisan will appreciate that various modifications, substitutions, omissions, and changes may be made without departing from the spirit thereof. Accordingly, it is intended that the scope of the subject matter limited solely by the scope of the following claims, including equivalents thereof.

The invention claimed is:

1. A method of making a phenolic compound-formaldehyde gel, the method comprising:
   preparing a reaction mixture comprising a phenolic compound and formaldehyde; and
   irradiating the reaction mixture with ionizing radiation, thereby producing the phenolic compound-formaldehyde gel.

2. The method of claim 1, wherein the phenolic compound is selected from the group consisting of a dihydroxybenzene, a trihydroxybenzene, and mixtures thereof.

3. The method of claim 2, wherein the phenolic compound is selected from the group consisting of resorcinol, catechol, hydroquinone, and mixtures thereof.

4. The method of claim 3, wherein the phenolic compound is resorcinol.

5. The method of claim 1, wherein the ionizing radiation is gamma irradiation.

6. The method of claim 5, wherein the gamma irradiation is a dose from about 10 to 70 kGy.

7. The method of claim 6, wherein the ionizing radiation is produced by a radiation source comprising radioactive $^{60}$Co.

8. The method of claim 1, wherein the reaction mixture is substantially free of a polymerization initiator, a polymerization catalyst, an acid, a base, a buffer, and other additives.

9. The method of claim 1, wherein the reaction mixture does not comprise a solvent.

10. The method of claim 1, wherein the phenolic compound-formaldehyde gel is a xerogel, an aerogel, or a cryogel.

11. The method of claim 1, further comprising:
waiting for gelation of the reaction mixture.

12. The method of claim 10, wherein gelation of the reaction mixture comprises crosslinking of the phenolic compound during irradiating of the reaction mixture.

13. The method of claim 1, further comprising:
curing the phenolic compound-formaldehyde gel.

14. A method of making a phenolic compound-formaldehyde gel, the method comprising:
preparing a reaction mixture comprising a phenolic compound and formaldehyde; and
irradiating the reaction mixture with ionizing radiation, thereby producing the phenolic compound-formaldehyde gel; and further comprising
converting the phenolic compound-formaldehyde gel to an activated carbon.

15. The method of claim 14, wherein the phenolic compound-formaldehyde gel is a resorcinol-formaldehyde gel; and
wherein the converting the phenolic compound-formaldehyde gel to the activated carbon comprises heating up the resorcinol-formaldehyde gel to 500° C. for 3 hours while purging with nitrogen gas.

16. The method of claim 15, wherein the purging with nitrogen is at a gas flow rate of about 100 cm$^3$/min.

17. The method of claim 15, wherein the method further comprises heating up a carbonized resorcinol-formaldehyde gel to 700° C. for 1 hour while purging with carbon dioxide gas.

18. The method of claim 17, wherein the purging with carbon dioxide is at a gas flow rate of about 150 cm$^3$/min.

19. The method of claim 1, wherein the reaction mixture's ratio of phenolic compound to formaldehyde is at least about 1:9.

20. The method of claim 14, wherein the activated carbon has an average pore size of from about 1.0 to 2.1 nm.

21. The method of claim 14, wherein the activated carbon has an average area of micropores of from about 0.3 to 1.1% of the total area.

22. The method of claim 14, wherein the activated carbon has an average area of mesopores of from about 11 to 35% of the total area.

23. The method of claim 14, wherein the activated carbon has an average area of macropores of from about 63 to 88% of the total area.

24. The method of claim 14, wherein the activated carbon has an average particle size of from about 0.2 to 6.6 µm.

25. The method of claim 14, wherein the $I_D/I_G$ ratio of activated carbons is from about 0.82 to 0.90.

26. The method of claim 14, wherein the activated carbon has an activated carbon yield of at least about 14%.

27. The method of claim 26, wherein the activated carbon has an activated carbon yield of at least about 32%.

* * * * *